(12) United States Patent
Hoshida

(10) Patent No.: US 8,406,638 B2
(45) Date of Patent: Mar. 26, 2013

(54) COHERENT LIGHT RECEIVING SYSTEM

(75) Inventor: Takeshi Hoshida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 932 days.

(21) Appl. No.: 12/219,937

(22) Filed: Jul. 30, 2008

(65) Prior Publication Data
US 2009/0047030 A1 Feb. 19, 2009

(30) Foreign Application Priority Data
Aug. 16, 2007 (JP) ................................ 2007-212452

(51) Int. Cl.
*H04B 10/06* (2006.01)

(52) U.S. Cl. ......... 398/202; 398/203; 398/204; 398/205

(58) Field of Classification Search ........... 398/203–205
See application file for complete search history.

(56) References Cited

U.S. PATENT DOCUMENTS

| | | | |
|---|---|---|---|
| 3,939,341 A | 2/1976 | Graves | |
| 4,965,858 A * | 10/1990 | Naito et al. | 398/205 |
| 5,060,312 A * | 10/1991 | Delavaux | 398/204 |
| 5,247,382 A | 9/1993 | Suzuki | |
| 5,272,556 A | 12/1993 | Faulkner et al. | |
| 5,352,885 A | 10/1994 | Niki | |
| 5,422,752 A * | 6/1995 | Hardcastle | 398/187 |
| 5,473,463 A * | 12/1995 | van Deventer | 398/205 |
| 5,548,434 A | 8/1996 | Shimonaka et al. | |
| 5,561,389 A * | 10/1996 | Duley | 327/143 |
| 6,493,131 B1 * | 12/2002 | Tarng et al. | 359/326 |
| 7,110,677 B2 | 9/2006 | Reingand et al. | |
| 7,149,435 B2 | 12/2006 | Kuri et al. | |
| 7,636,525 B1 * | 12/2009 | Bontu et al. | 398/208 |
| 7,826,752 B1 * | 11/2010 | Zanoni et al. | 398/205 |
| 7,899,340 B1 * | 3/2011 | Bontu et al. | 398/209 |
| 7,936,999 B1 * | 5/2011 | Hawryluck et al. | 398/206 |
| 2002/0012152 A1 * | 1/2002 | Agazzi et al. | 359/189 |
| 2002/0186435 A1 * | 12/2002 | Shpantzer et al. | 359/136 |
| 2003/0063285 A1 * | 4/2003 | Pering et al. | 356/451 |
| 2003/0126377 A1 * | 7/2003 | Orenstien et al. | 711/146 |
| 2003/0197917 A1 * | 10/2003 | Yap et al. | 359/330 |

(Continued)

FOREIGN PATENT DOCUMENTS

| | | |
|---|---|---|
| EP | 1 195 927 A2 | 4/2002 |
| JP | 11-271698 | 10/1999 |

OTHER PUBLICATIONS

European Search Report issued on Nov. 3, 2008 in corresponding European Patent Application 08162151.8.

(Continued)

*Primary Examiner* — Nathan Curs
*Assistant Examiner* — Tanya Ngo
(74) *Attorney, Agent, or Firm* — Staas & Halsey LLP

(57) ABSTRACT

In order to reduce the size and simplify the structure of a coherent light receiver, the coherent light receiver includes an optical mixer for coupling local oscillator light and reception signal light, a photoelectric converter for photoelectrically converting light coupled in the optical mixer, a reception data processing unit for extracting reception data included in the reception signal light through digital signal processing for processing the coupled signal converted into an electrical signal by the photoelectric converter, based on a first clock, and a modulator for modulating the local oscillator light or the reception signal light inputted to the optical mixer respectively, by using a clock phase-synchronized with the first clock used for the digital signal processing in the reception data processing unit.

9 Claims, 20 Drawing Sheets

U.S. PATENT DOCUMENTS

| | | | |
|---|---|---|---|
| 2004/0114939 A1* | 6/2004 | Taylor | 398/152 |
| 2004/0126108 A1 | 7/2004 | Chung et al. | |
| 2004/0208643 A1* | 10/2004 | Roberts et al. | 398/186 |
| 2006/0140319 A1* | 6/2006 | Eldredge et al. | 375/371 |
| 2006/0215466 A1* | 9/2006 | Tseng | 365/194 |
| 2007/0041253 A1* | 2/2007 | Tseng | 365/194 |
| 2008/0145066 A1 | 6/2008 | Hoshida | |
| 2011/0150504 A1* | 6/2011 | Ellis et al. | 398/203 |
| 2011/0200339 A1* | 8/2011 | Komaki et al. | 398/208 |

OTHER PUBLICATIONS

Chinese Office Action for Application No. 200810129873.7; issued Dec. 21, 2010.

F. Derr, "Coherent Optical QPSK Intradyne System" Concept and Digital Receiver Realization, Journal of Lightwave Technology, vol. 10, No. 9, pp. 1290-1296, Sep. 1992.

L.G. Kazovsky, "Phase- and Polarization-Diversity Coherent Optical Techniques", Journal of Lightwave Technology, vol. 7, No. 2, pp. 279-292, Feb. 1989.

A.D. Kersey et al., "New Polarisation-Insensitive Detection Technique for Coherent Optical Fibre Heterodyne Communications", Electronics Letter, vol. 23, No. 18, pp. 924-926, Aug. 27, 1087.

O. Ishida, "Pure Frequency Modulation of a Multielectrode Distributed-Bragg-Reflector (DBR) Laser Diode", IEEE Photonics Technology Letters, vol. 1, No. 7, pp. 156-158, Jul. 1989.

Goodbar and Schiess, "Characterization of the Modulation and Noise Properties of a Three-Electrode DFB Laser", IEEE Photonics Technology Letters, vol. 4, No. 5, pp. 414-416, May 1992.

Ly-Gagnon, et al., Unrepeated 210-km Transmission with Coherent Detection and Digital Signal Processing of 20-Gb/s QPSK Signal, Optical Society of America 2005, OTuL4.

D. Smith, et al., "Integrated-Optic Acoustically-Tunable Filters for WDM Networks", IEEE Journal on Selected Areas in Communications, vol. 8, No. 6, pp. 1151-1159, Aug. 1990.

Tutorial [online], Hakuto Co., Ltd. [searched on Aug. 6, 2007] on the Internet Site, <http://www-newport-japan,jp/pdf/phot_0044.pdf>.

U.S. Appl. No. 11/905,148, filed Sep. 27, 2007, Takeshi Hoshida, Fujitsu Limited.

U.S. Office Action mailed May 26, 2010 in related U.S. Appl. No. 11/905,148.

* cited by examiner

COHERENT LIGHT RECEIVING SYSTEM

TECHNICAL FIELD

It relates to an optical receiver used for an optical transmission system, particularly to, an optical receiver of a coherent light receiving system independent of a state of polarization of a signal light and an optical communication system.

In order to realize an ultrafast optical transmission system at 40 Gbit/s or more, optical receiver-transmitters based on multivalued phase modulation such as RZ-DQPSK (Return-to-Zero Differential Quadrature Phase Shift Keying) are developed. It is required to further improve an optical-noise tolerance of the optical receiver-transmitters based on the multivalued phase modulation and reduce the size of the optical receiver-transmitters by replacing a large-scaled optical variable dispersion compensator with strong electrical-signal processing in the future. As means for realizing this, coherent light receiving system preferably includes, e.g., a homodyne system, intradyne system, and heterodyne system and the use thereof is examined (e.g., refer to a document: F. Derr, "Coherent optical QPSK intradyne system: Concept and digital receiver realization", Journal of Lightwave Technology. Vol. 10, No. 9, pp. 1290 to 1296, on September, 1992). With the coherent light receiving system, the optical-noise tolerance is improved by 3 dB, and it is considered to greatly increase the compensation capability of a wavelength dispersion distortion due to electrical signal processing after photoelectrical conversion, as compared with delayed detection.

However, the coherent light receiving system has a principle problem that reception is not possible when a state of polarization of local oscillator light outputted from a local oscillating light source provided for an optical receiver is orthogonal to a state of polarization of the received signal light. Since the state of polarization of the signal light propagated and received via an optical line always changes depending on the state of the optical line, a system for solving the problem is important.

As a conventional technology for removing the polarization dependence of the coherent light receiver, the following system is well known (refer to, e.g., a document: L. G. Kazovsky, "Phase- and polarization-diversity coherent optical techniques", Journal of Lightwave Technology, Vol. 7, No. 2, pp. 279 to 292, on February 1989 and a document: A. D. Kersey et al., "New polarization-insensitive detection technique for coherent optical fiber heterodyne communications", Electronics Letters, Vol. 23, pp. 924 to 926, on Aug. 27, 1987).

(I) System having an infinite-following auto-polarization controller, with which a state of polarization of reception signal light always matches a state of polarization of local oscillator light.

(II) System using a polarization diversity light-receiving front-end obtained by duplexing a phase hybrid circuit and a photoelectrical conversion portion.

(III) System with polarization multiplexed local oscillator light where the optical frequencies of the orthogonal polarization components of the polarization multiplexed local oscillator light are shifted from each other by a frequency difference approximately equal to or larger than two times of the electrical signal band width of the received signal, which enables coherent reception of each polarization components of the signal by means of frequency demultiplexing after the photoelectrical conversion.

The coherent light receiver obtained by combining a phase diversity system and a digital signal processing does not need an optical phase-locked-loop required in the homodyne system. For example, U.S. Pat. No. 7,110,677 specification discloses an example of the structure of a coherent light receiver obtained by combining a phase diversity system and digital signal processing.

FIG. 15 shows the structure of the coherent light receiver disclosed in U.S. Pat. No. 7,110,677 specification. Referring to FIG. 15, a coherent light receiver 200 comprises: a local oscillator (LO) 201; a 2×4 phase hybrid circuit 202; differential photodetectors (D-PD) 203-1 and 203-2; analog to digital converters (ADCs) 204-1 and 204-2; digital signal processing (DSP) 205; decision 206; a voltage controlled oscillator (VCO) 207 serving as a clock source; and a divider 208.

The 90-degree phase hybrid circuit 202 having two inputs and four outputs receives local oscillator light from the LO 201 at one input terminal, further receives reception signal light whose state of polarization is aligned with a state of polarization of the local oscillator light from the LO 201 at another input terminal with the means for removing the polarization dependence, and outputs a pair of coupled light outputs with the phase difference of 90 degree. Herein, each of the coupled light output has two differential output ports and thus has four output terminals in total. However, the structure without the differential output is also well known and the number of output terminals may be two in this case.

Each of the two differential photodetectors 203-1 and 203-2 individually performing differential reception of the coupled light output from the corresponding terminals from the 2×4 phase hybrid circuit 202, converts the light into an electrical signal, and outputs the converted signal to the ADCs 204-1 and 204-2. The ADCs 204-1 and 204-2 convert, into digital signals, the electrical signals from the differential photodetectors 203-1 and 203-2 at a sampling timing defined by a clock frequency from the VCO 207, and sends the converted digital signals to the digital signal processing 205.

The digital signal processing 205 performs digital signal processing on the digital signals inputted from the ADCs 204-1 and 204-2 to obtain information including a real part and an imaginary part, thereby estimating information on an amplitude and a phase of an electrical field of the original reception signal light. Further, the decision 206 performs decision processing depending on the optical modulation format adopted in the transmitting side by using the digital signal obtained as a result of estimating the information on the amplitude and phase by the digital signal processing 205, thereby reproducing reception data.

Incidentally, the digital signal processing 205 is usually operated at an operation clock frequency lower than a bit rate of the reception data included in the reception signal light. The divider 208 generates a subharmonic clock of the clock signal provided from the VCO 207, and outputs the subharmonic clock as an operation clock to the digital signal processing 205. As a consequence, the digital signal processing 205 performs the digital signal processing of the digital signals from the ADCs 204-1 and 204-2 with parallel processing corresponding to the subharmonic order.

However, the conventional technology to remove the polarization dependence has a problem in terms of flexiblility to deal with signal light at a high bit-rate or in terms realizing a small coherent-optical-receiver independent of the polarization. That is, the system in (I) requires the infinite following auto-polarization controller and the size cannot be reduced. In addition, when polarization mode dispersion and non-linear optical effect of a transmission line deteriorate the degree of polarization of the signal light, the state of polarization of the signal light cannot be completely aligned to that of the local oscillator light. Therefore, reception performance can deteriorate. Further, the system in (II) requires a light receiving front-end circuit with a large scale of two or more times, and the size thereof cannot be thus reduced. Moreover, the system in (III) requires an electrical circuit and a photoelectrical conversion element having a wide frequency band of three or more times of a signal band width, and the signal light at a high bit rate cannot be used.

Herein, a description will be given of the problem of the system in the (III).

FIG. 16 is a diagram showing the structure of a coherent light receiver using the system in (III). In a conventional coherent light receiver 100, a local light generator 101 transmits light with an optical anglular frequency $\omega_L$ outputted from a light source (LS) 111 to a polarization beam splitter (PBS) 113 via an optical isolator (ISO) 112, and splits the light into orthogonal polarization components. Further, one polarization component is inputted to an acousto-optic modulator (AOM) 114 and the optical anglular frequency is shifted by $\omega_0$. A polarization component of an optical angular frequency $\omega_L+\omega_0$ and the other polarization component split by the PBS 113 are combined by a polarization beam combiner (PBC) 115, thereby generating a local oscillator light $E_{LO}$ obtained by polarization-multiplexing a polarization component (Ex(t) component in FIG. 17) of the optical angular frequency $\omega_L$ and a polarization component (Ey(t) component in FIG. 17) of the optical angular frequency $\omega_L+\omega_0$ orthogonal to the polarization component of the optical angular frequency $\omega_L$, as shown in a conceptual diagram shown in FIG. 17.

An optical coupler 102 couples the local oscillator light $E_{LO}$ outputted from the local light generator 101 to reception signal light $E_s$ having an optical angular frequency $\omega_s$. Thereafter, an optical detector 103 receives the multiplexed light and converts the reception light into an electrical signal. The electrical signal includes a signal component $A_1$ of an intermediate frequency $\omega_i$ due to beat between the reception signal light Es and the polarization component of the optical angular frequency $\omega_L$ included in the local oscillator light $E_{LO}$, and a signal component $A_2$ of the intermediate frequency $\omega_i+\omega_0$ due to beat between the reception signal light $E_s$ and the polarization component of the optical angular frequency $\omega_L+\omega_s$ included in the local oscillator light $E_{LO}$. Therefore, outputs from the optical detector 103 are transmitted to band pass filters (BPFs) 104 and 105, thereby separates the intermediate-frequency signals $A_1$ and $A_2$ depending on the frequency. Further, the intermediate-frequency signals $A_1$ and $A_2$ are inputted to a signal processing circuit 106 and predetermined signal processing is executed, thereby reproducing reception data DATA.

In this case, the intermediate-frequency signals $A_1$ and $A_2$ inputted to the signal processing circuit 106 have electrical spectra as shown in a schematic diagram in FIG. 18. Specifically, the intermediate-frequency signal $A_1$ has a spectrum width corresponding to two times of the signal band width around the frequency $\omega_i$ as center, and the intermediate-frequency signal $A_2$ has a spectrum width corresponding to two times of the signal band width around the frequency $\omega_1+\omega_0$. Further, a power difference $\Delta P$ between the intermediate-frequency signals $A_1$ and $A_2$ changes depending on the state of polarization of the reception signal light. Therefore, it is necessary to set the band width of the signal processing circuit 106 to be four times or more of the signal band width in the example shown in FIG. 18. Incidentally, upon setting the optical angular frequency $\omega_L$ of the local oscillator light so that the intermediate frequency $\omega_i$ is close to 0 Hz, the band width of the signal processing circuit 106 is close to three times of the signal band width.

Therefore, the conventional coherent light receiver in the system in (III) requires an electrical circuit having a band width of three times or more of the signal band width of signal light at 40 Gbit/s, i.e., 120 Gbit/s or more, fast signal light at 40 Gbit/s or more cannot be realized.

SUMMARY

According to an aspect of an embodiment, a coherent light receiver includes an optical mixer for coupling local oscillator light and reception signal light, a photoelectric converter for photoelectrically converting light coupled in the optical mixer, a reception data processing unit for extracting reception data included in the reception signal light through digital signal processing for processing the coupled signal converted into an electrical signal by the photoelectric converter, based on a first clock, and a modulator for modulating the local oscillator light or the reception signal light inputted to the optical mixer respectively, by using a clock phase-synchronized with the first clock used for the digital signal processing in the reception data processing unit.

As described above, the received multivalued signal light can be converted into an electrical signal with a set of simple optical components, thereby realizing the reduction in size and the simplification of the structure corresponding to the high rate.

DESCRIPTION OF THE PREFERRED EMBODIMENTS

Figure 1:
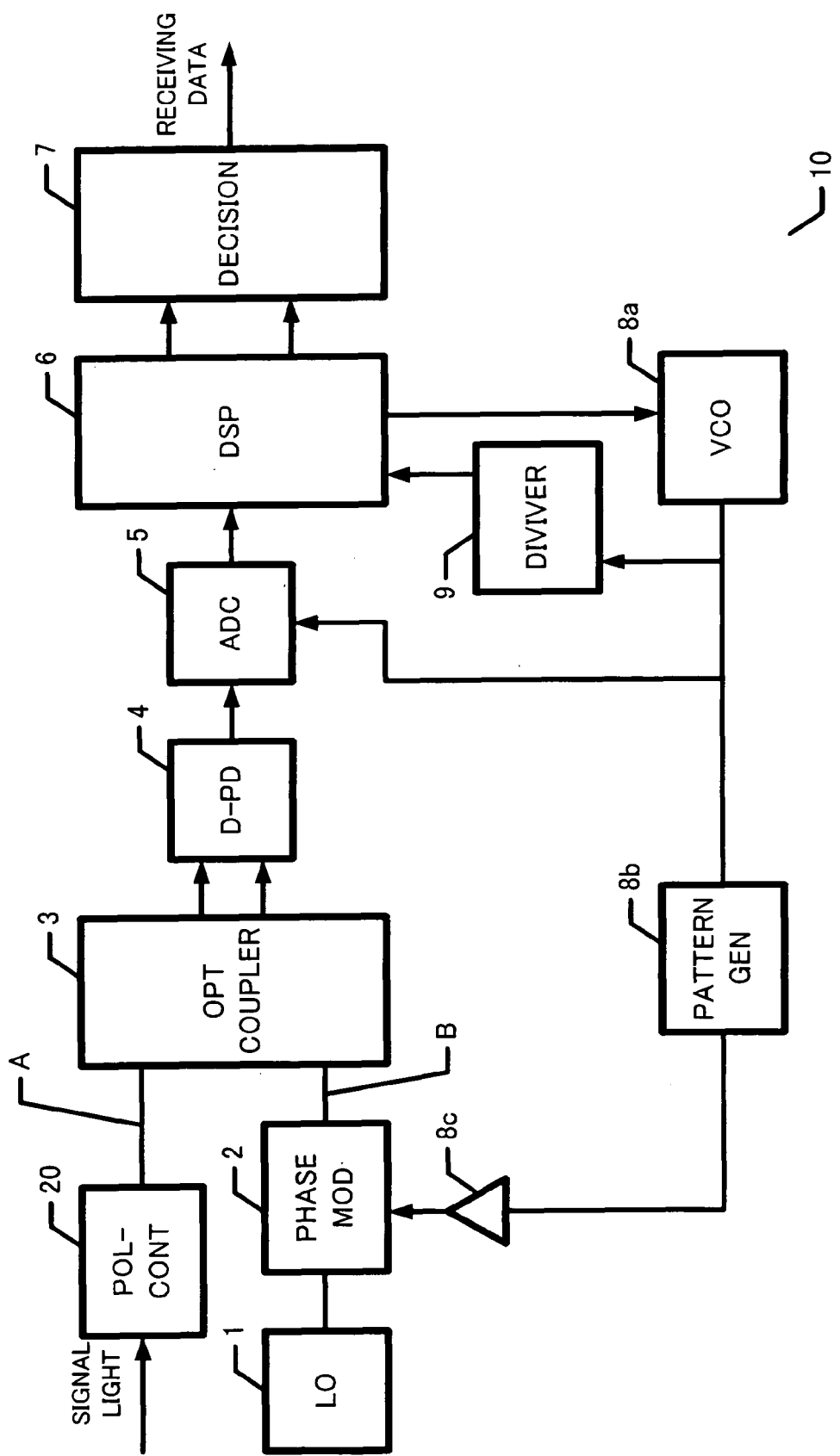
FIG. 1 is a diagram showing a coherent light receiver according to the first embodiment.

Hereinbelow, a description will be given of embodiments of the present invention with reference to the drawings.

The same reference numerals denote the same components in the drawings.

Incidentally, the present invention is not limited to the following embodiments. Further, not only the objects, another technological problem, means for solving the problem, and operations and advantages thereof will be obvious in the disclosure of the following embodiments.

[A] First Embodiment

FIG. 1 is a diagram showing a coherent light receiver 10 according to the first embodiment. The coherent light receiver 10 shown in FIG. 1 can be applied as an optical receiver 306 in an optical communication system 300 shown in FIG. 3. Herein, in the optical communication system 300 shown in FIG. 3, a wavelength-division-multiplexing transmitting apparatus 301 is connected to a wavelength de-multiplexing receiving apparatus 302 via an optical network 310.

The wavelength-division-multiplexing transmitting apparatus 301 comprises: a plurality of optical transmitters (T) 303 that output optical signals with different wavelengths; and a wavelength multiplexer 304. The optical transmitters 303 modulate light by using multivalued phase modulation such as DQPSK, QPSK and QAM (Quadrature Amplitude Modulation), and outputs the modulated light as light signal.

The wavelength multiplexer 304 multiplexes the optical light from the optical transmitters 303 in wavelength domain and transmits the multiplexed light to the optical network 310.

Further, the wavelength de-multiplexing receiving apparatus 302 comprises: a wavelength de-multiplexer 305 that splits wavelength multiplexed light signals propagated through the optical network 310 for every wavelength; and a plurality of receivers (R) 306 having the structure as the coherent light receiver 10. That is, the receivers 306 coherently receive, as light, optical signals based on the unit of wavelength, split by the wavelength de-multiplexer 305, and performs decision processing of the reception data corresponding to the optical modulation on the transmission side.

Furthermore, the optical network 310 comprises optical transmission lines 311 and optical add/drop multiplexers (OADMs) 312, and cross-connect devices (XC) 313 such as wavelength cross-connects (WXCs) and photonic cross-connects (PXCs) on the optical line 311 and an optical amplification repeaters 314. The OADMs 312 and the cross-connect devices 313 can accommodate a transmitter 303 and the receivers 306 similar to those provided for the wavelength-division-multiplexing transmitting apparatus 301 and the wavelength de-multiplexing receiving apparatus 302.

Incidentally, the terminal stations 301 and 302 and the devices 312 to 314 on the optical network 310 may include a wavelength dispersion compensator (not shown).

Figure 3:
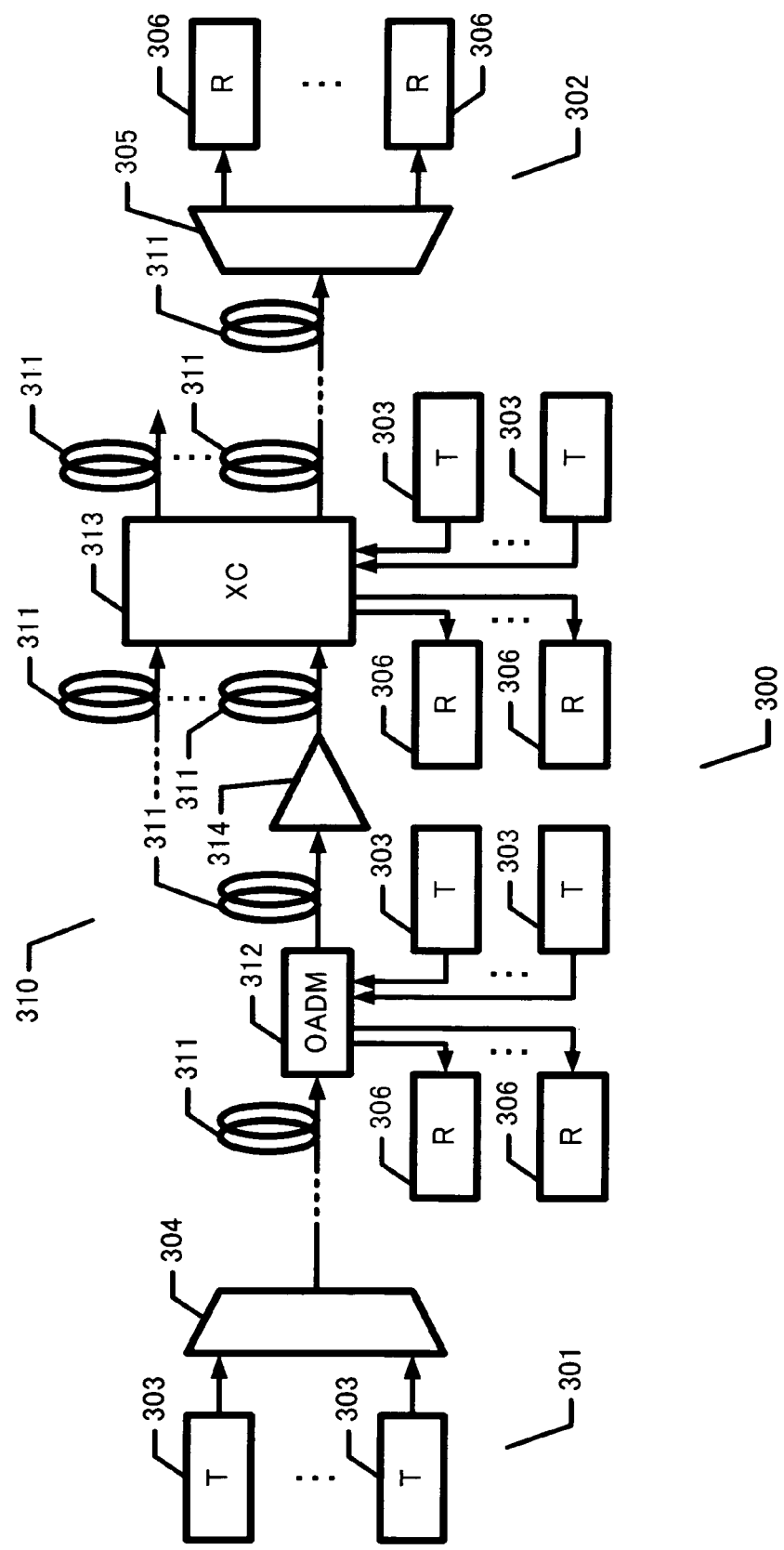
FIG. 3 is a diagram showing an optical communication system to which the coherent light receiver is applied according to the first embodiment.

Incidentally, the optical communication system 300 shown in FIG. 3 is an example of the optical communication system to which the coherent light receiver 10 according to the first embodiment is applied, and can comprise an optical communication system with another structure without terminal stations, such as an optical ring or optical mesh, with a point-to-point structure without the OADMs 312 or the cross-connect devices 313 shown in FIG. 3, with a structure of linear OADM or OADM ring without the WXCs, or with a structure having no optical amplification repeaters 314.

Figure 15:
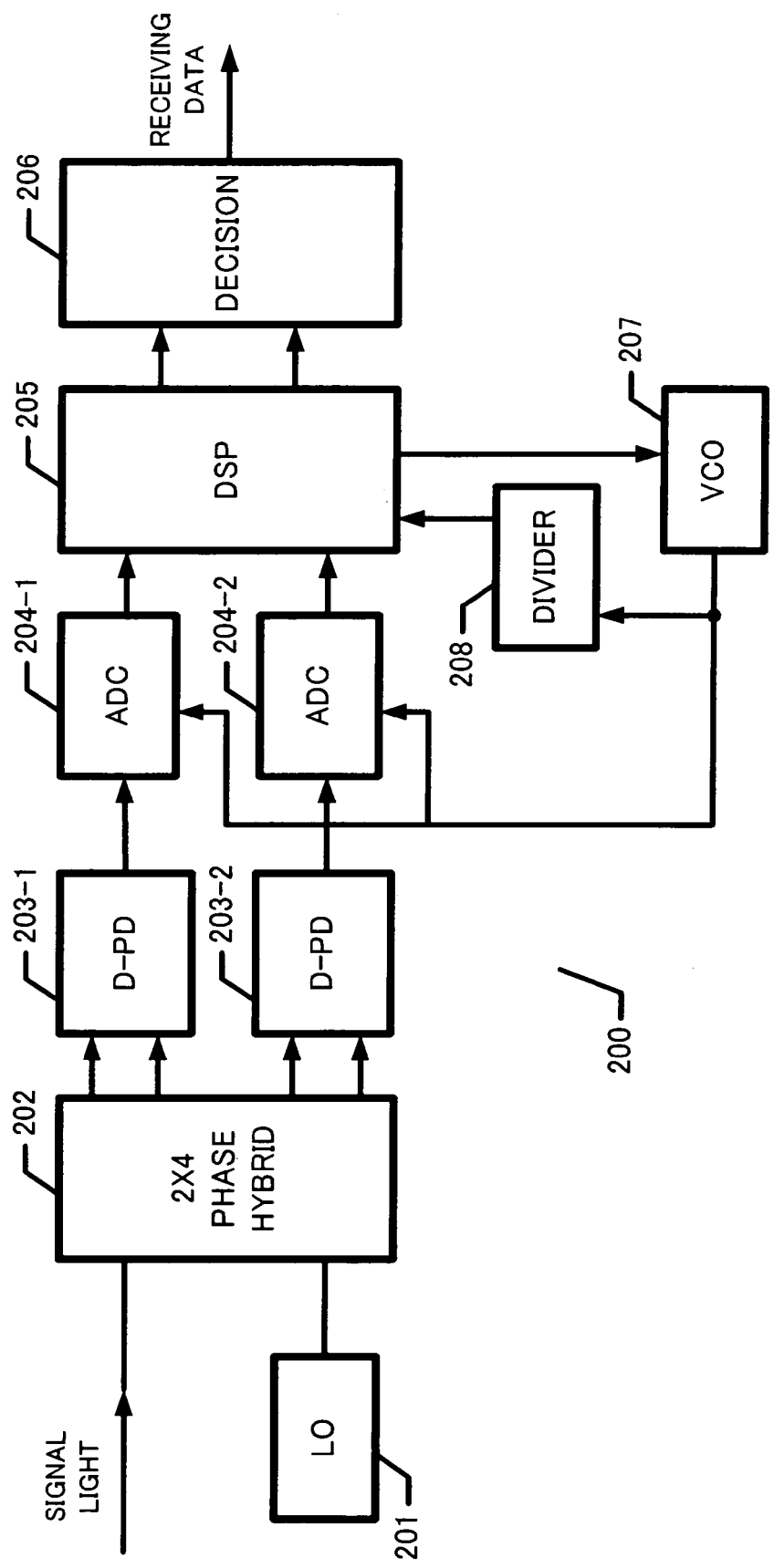
FIG. 15 is a diagram showing a schematic structure of a conventional coherent light receiver.

Herein, the coherent light receiver 10 shown in FIG. 1 does not use a phase diversity structure shown in FIG. 15, and performs extracting processing (demodulation) of data by signal processing substantially equivalent to the phase diversity. That is, unlike the phase diversity structure shown in FIG. 15, a 90-degree phase hybrid circuit (reference numeral 202 in FIG. 15) is not required and a differential photodetector 4 and an ADC 5 are on one system. Then, the above problem in FIG. 15 is solved. Therefore, the coherent light receiver 10 comprises: an local oscillator (LO) 1; a phase modulator 2; an optical coupler 3 with two inputs and two outputs; the differential photodetector (D-PD) 4; the ADC 5; digital signal processing (DSP) 6; decision 7; a voltage controlled oscillator (VCO) 8a; a repetitive pattern generator 8b; a phase shift adjustor 8c; and a divider 9.

The LO 1 generates continuous light serving as local oscillator light for receiving coherent light, and the optical frequency is set to be similar to the reception signal light (however, an error of one severalth or less of a symbol rate can be permitted depending on the design of the digital signal processing 6). Further, the phase modulator 2 receives a clock signal derived from a clock signal generated by the VCO 8a via the repetitive pattern generator 8b and the phase shift adjustor 8c, which will be described later. Based on the clock signal, the phase modulator 2 modulates an optical phase of the light from the LO 1 with a phase swing of, substantially, 90 degrees.

Figure 2:
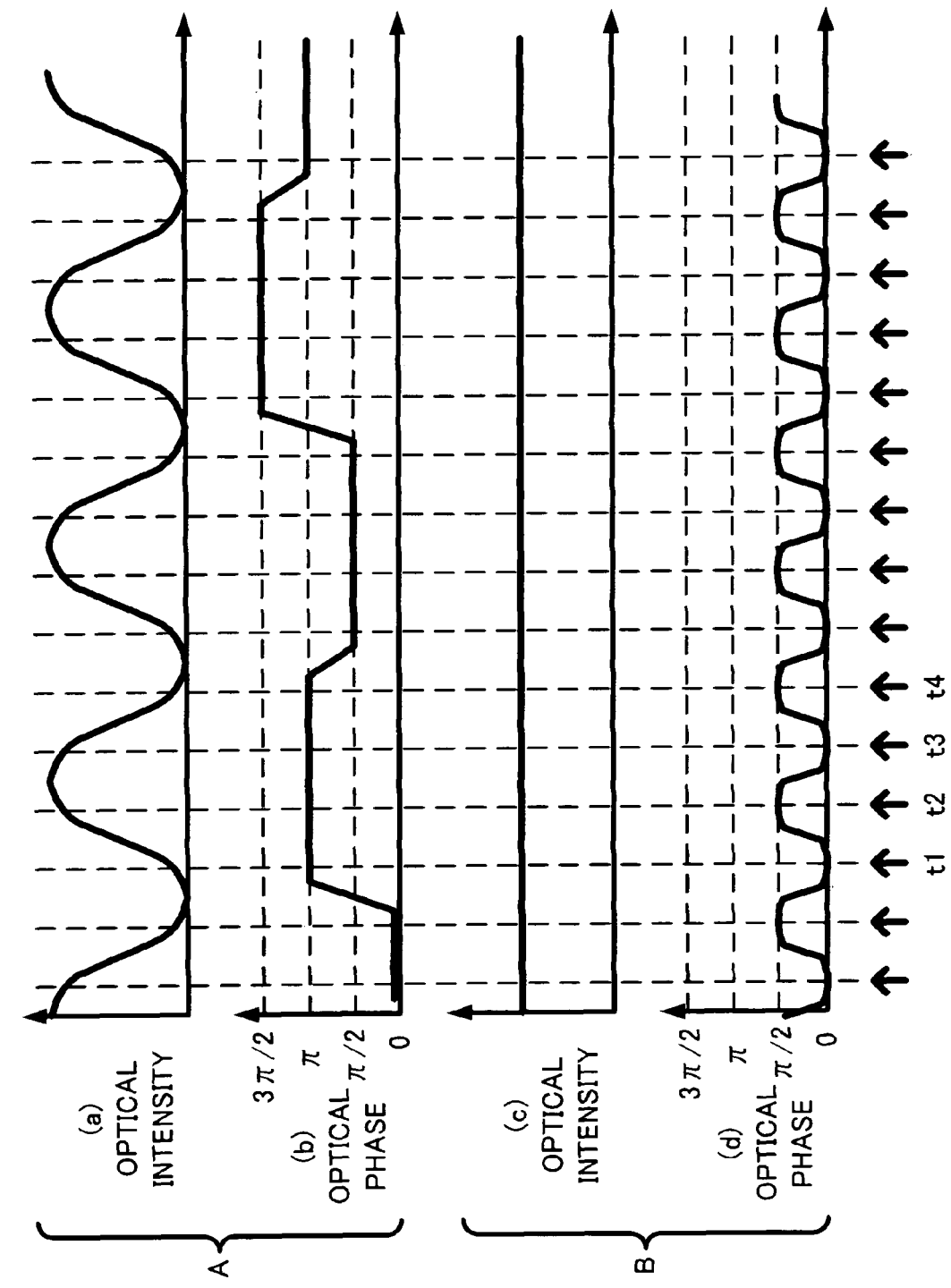
FIG. 2 is an explanatory diagram of reception signal light and local-oscillator modulation light that are inputted to an optical coupler according to the first embodiment.

That is, the light outputted from the phase modulator 2 has a constant optical intensity (c) as shown in FIG. 2. However, as shown in FIG. 2, an optical phase (d) is alternately repeated between "0" and "π/2" synchronously with the clock signal from the VCO 8a. Further, the light output from the phase modulator 2 is outputted to the optical coupler 3 so as to be coupled to the reception signal light, as phase-modulated local oscillator light (local-oscillator modulation light, refer to FIGS. 1 and B in FIG. 2).

As shown by an optical intensity (a) and an optical phase (b) in FIG. 2, upon receiving an optical signal subjected to RZ-DQPSK modulation as the reception signal light, the alternately-repeated phase state can be switched synchronously with a symbol rate at a frequency corresponding to four times of a symbol frequency of the reception signal light. Specifically, the local-oscillator modulation light from the phase modulator 2 is switched with the phase states "0" and "π/2" for one-symbol rate. Specifically, at the timing for outputting light with the same phase component as that of the local oscillator light from the LO 1, the phase state is "0" and, at the timing for outputting light with a phase orthogonal to that of the local oscillator light from the LO 1, the phase state is "π/2".

The (2×2) optical coupler 3 with two inputs and two outputs is an optical mixer that couples the local oscillator light in FIG. 1 and reception signal light A in FIG. 2 to be inputted. That is, the optical coupler 3 couples the local-oscillator modulation light from the phase modulator 2 and the reception signal light, and outputs the differential output signal to the differential photodetector 4. Specifically, as shown by the optical phase (b) in FIG. 2, for a period (refer to times t1 to t4) for inputting the component with a phase of the symbol "π" that is modulated for the reception signal light to the optical coupler 3, corresponding to the sampling times t1 to t4 in the ADC 5 at the post stage, the local-oscillator modulation light with modulated phases "0", "π/2", "0", and "π/2" is inputted to the optical coupler 3. Therefore, the optical coupler 3 outputs, as the differential output signals, the coupled light of the local oscillator light and the reception signal light with the phase "0" at the times t1 and t3 and the coupled light of the local oscillator light and the reception signal light with the phase "π/2" at the times t2 and t4. Incidentally, the phase "0" may be "0"+θ and the phase state "π/2" may be "π/2"+θ where θ is an arbitrary value. That is, the relative phase difference between the times t1, t3, . . . , to and the times t2, t4, . . . tn+1 may be π/2.

The differential photodetector 4 is a photoelectric converter that photoelectrically converts light of the coupled signal obtained by coupling with the optical coupler 3 as the optical mixer. That is, the differential photodetector 4 receives differential light of the coupled light from the optical coupler 3, converts the received light into an analog electrical signal, and outputs the converted signal to the ADC 5.

The ADC 5 is an A/D converter unit that converts, into a digital signal, the coupled signal converted into the electrical signal by the differential photodetector 4 as the photoelectric converter at the sampling timing synchronous with a first clock. That is, the ADC 5 converts the signal into a digital signal at the sampling timing based on the clock signal (first clock) from the VCO 8a, and outputs the digital signal to the digital signal processing 6.

At this time, the first clock for prescribing the sampling timing of the ADC 5 and a second clock for modulating the phase with the phase modulator 2 are derived from the VCO 8a, and can be mutually synchronized in terms of phases. That is, the digital signal derived from the coupled light of the local-oscillator modulation light phase-modulated with the phase state "0" by the phase modulator 2 and the reception signal light is synchronized with the digital signal derived from the coupled light of the reception signal light and the local-oscillator modulation light phase-modulated with the phase state "π/2" at the switching timing of the phase modulation and both the digital signals are inputted to the ADC 5. The ADC 5 can sample the digital signals at the sampling timing synchronous with the first clock from the VCO 8a without fail.

Incidentally, the wiring lengths of clock signal lines to the ADC 5 and the phase modulator 2 from the VCO 8a are adjusted to mutually match phases of the first clock and the second clock to be inputted thereto. Further, a circuit (not shown) may mediate to adjust the phases on any of the clock signals to the ADC 5 and the phase modulator 2.

Herein, in a coherent light receiver 200 shown in FIG. 15, an optical 90-degree phase hybrid circuit 202 sets the coupled light having two systems of the reception signal light and the local oscillator light, and generates light obtained by coupling any (e.g., the local oscillator light) of the coupled light having two systems with a phase orthogonal to that at the input timing. Further, the two differential photodetectors 203-1 and 203-2 and the two ADCs 204-1 and 204-2 are provided to guide the digital signals derived from the coupled light having the two systems to the digital signal processing 205.

On the other hand, in the coherent light receiver 10 according to the first embodiment shown in FIG. 1, the local-oscillator modulation light from the phase modulator 2 is alternately switched with a phase swing for setting the phase states to be orthogonal thereto. The coupled light outputted as the differential from the optical coupler 3 can be similar to light obtained by time division of the coupled light having the two systems outputted by the optical 90-degree phase hybrid circuit 202 (refer to FIG. 15) and alternately outputting the time-divided coupled light. Hence, one differential photodetector 4 and one ADC 5 may be provided to guide the digital signal derived from the coupled light having two systems to the digital signal processing 6 (phase diversity structure can be realized). Further, the local-oscillator modulation light having the phase states of the two systems based on the time division may be coupled to the reception signal light without generating the light having the two systems with the phases orthogonal to each other by using a special circuit like the 90-degree phase hybrid circuit 202. Thus, as an optical element for coupling, a circuit (herein, optical coupler) with the structure simpler than the 90-degree phase hybrid circuit can be applied.

The digital signal processing 6 executes operation processing for extracting information on the reception data included in the reception signal light by using the digital signal from the ADC 5 forming A/D converting unit. At this time, the digital signal processing 6 can capture a digital signal (I) having a first data sequence derived from the coupled light having the reception signal light and the local-oscillator modulation light with the phase state "0" per symbol of the reception signal light and a digital signal (Q) having a second data sequence derived from the coupled light having the reception signal light and the local-oscillator modulation light with the phase state "π/2". As a consequence, the digital signal processing 6 can obtain information containing a real part and an imaginary part, concerning the amplitude information and the phase information of a photofield of the reception signal light with the operation processing.

The decision 7 performs decision processing of the reception data on the basis of the operation result from the digital signal processing 6. That is, the decision 7 performs the decision processing of the reception data on the basis of the result (signal vector: refer to an expression (9) which will be described later) of operation processing for extracting the information on the reception data from the digital signal processing 6 depending on the optical modulation system of the apparatus on the sending side of the reception signal light, thereby recovering the reception data. Herein, the optical modulation system can include, e.g., BPSK (Binary Phase Shift Keying), M-ary Phase Shift Keying such as QPSK, M-ary Differential Phase Shift Keying as differential coding, M-ary Amplitude and Phase Shift Keying, M-ary Quadrature Amplitude Modulation, and RZ pulses of the optical intensity wavelengths thereof.

Further, the VCO 8a generates the first clock for prescribing the sampling timing to the ADC 5. However, in the digital signal processing 6, the first clock generated by the VCO 8a is best controlled on the basis of the result of the operation result for extracting the reception data.

Furthermore, the phase modulator 2 executes phase modulation of the light from the LO 1, alternately repeated with the phase state "0" or "π/2" substantially synchronously with the sampling of the ADC 5. Therefore, the repetitive pattern generator 8b generates the clock signal obtained by dividing a first clock signal from the VCO 8a into two signals, and generates a repeating pattern (second clock) for phase modulation of the phase modulator 2.

In addition, under the control based on the result of the digital operation processing of the digital signal processing 6, the phase shift adjustor 8c adjusts the second clock for phase modulation from the repetitive pattern generator 8b with the modulation of the phase modulator 2 so that the phase swing of the light from the LO 1 is closer to a proper value (90 degrees). Therefore, the repetitive pattern generator 8*b* and the phase shift adjustor 8*c* form a modulation clock supply unit that generates, from the first clock from the VCO 8*a*, the second clock phase-synchronized with the first clock, having a frequency of one integral-th (herein, one half) of the first clock and supplies the generated second clock to the phase modulator 2.

Further, the VCO 8*a*, the repetitive pattern generator 8*b*, and the phase shift adjustor 8*c* form a clock supply unit that supplies the first clock (from the VCO 8*a*) to the ADC 5 forming the reception data processing unit, and further supplies a clock phase-synchronized with the first clock to the phase modulator 2.

Further, the divider 9 divides the frequency of the clock signal (first clock) from the VCO 8*a*, and outputs the frequency-divided clock signals as operation clocks to the digital signal processing 6. As a consequence, the digital signal processing 6 performs the digital operation processing of the digital signal from the ADC 5 with parallel processing corresponding to the number of frequency division. Incidentally, the divider 9 sets a frequency division ratio to set the sampling frequency of the ADC 5 to be at least twice of the operation clock of the digital signal processing 6 so that the digital signal processing 6 can perform the operation processing on the unit basis of the digital signal having a pair of data per symbol from the first data sequence and the second data sequence.

Further, the number of frequency division of the divider 9 is (2×N) where N is an integer. Then, upon setting, as one set, the operation of the digital signal having the first data sequence (I) and the operation of the digital signal having the second data sequence (Q), the digital signal processing 6 executes parallel-operation processing with N parallels.

Incidentally, the ADC 5 and the digital signal processing 6 are integrally structured in advance as a single module. Then, since a connection wiring of the ADC 5 and the digital signal processing 6 is designed in advance in the module, advantageously, the size of the device is reduced and the wiring load is also reduced. Therefore, the ADC 5 and the digital signal processing 6 form a reception data processing unit that performs processing for extracting the reception data included in the reception signal light via digital signal processing (A/D converting processing and digital operation processing) based on the first clock of the coupled signal converted into the electrical signal by the differential photodetector 4 forming the photoelectric converter.

In the case of the optical intensities (a) or (c) and the optical phases (b) or (d) in FIG. 2, for one symbol of the reception signal light, for example, the phase states of the local-oscillator modulation light are individually switched twice with phase differences "0" and "π/2". At least the reception data may be reproduced by one-time switching of the phase states. However, the use of the local-oscillator modulation light that is switched twice for the time of one symbol also enables processing for improving the signal quality such as dispersion compensation with signal processing using the digital signal processing 6 at the latter stage.

Given that parameter X denotes a transmission bit rate of the signal light, parameter m denotes a number of signal states in multivalued modulation of the signal light [reference numeral $\log_2$ m (bit/symbol) denotes the amount of information per symbol and m=4 in the case of the optical intensities (a) and the optical phases (b) in FIG. 2], parameter k denotes the number of obtaining times of the digital signals having the first system (I) and the second system (Q) per symbol [k=2 in the case of the optical phase (d) in FIG. 2, and parameter N denotes the number of parallel expansion based on the operation unit of the digital signals of a pair of the first data sequence and the second data sequence in the digital signal processing 6. Then, the VCO 8*a* generates the first clock signal having a trigger frequency 2 kX/$\log_2$ m, and the ADC 5 samples the signals synchronously with the first clock signal.

Further, the phase modulator 2 receives, as a clock for phase modulation, the second clock having a clock frequency (kX/$\log_2$ m) of one integral-th or integral-number times (herein, one half) of the first clock from the repetitive pattern generator 8*b*, and generates and outputs phase modulation light with two phase states, obtained from the light from the LO 1, which are alternately switched synchronously with the second clock.

Therefore, the LO 1 and the phase modulator 2 form a modulator that sets the local oscillator light to be inputted to the optical coupler 3 as the optical mixer, as modulation light using a clock phase-synchronized with the first clock used for the digital signal processing in the ADC 5 and the digital signal processing 6 forming the reception data processing unit. Further, the LO 1 and the phase modulator 2 according to the first embodiment form a modulated local light generator that generates the local-oscillator modulation light that is modulated on the basis of the second clock phase-synchronized with the first clock, and outputs the generated modulation light to the optical coupler 3.

Incidentally, reference numeral 20 denotes a polarization controller (polarization control means), and the polarization controller (POL-CONT) 20 matches the state of polarization of the reception signal light (refer to FIG. 1 and the reception signal light in FIG. 2) to be inputted to the optical coupler 3 to the state of polarization of the local-oscillator modulation light from the phase modulator 2. The polarization controller 20 comprises the infinite following auto-polarization controller.

In the coherent light receiver 10 with the above structure according to the first embodiment, the phase modulator 2 outputs the local-oscillator modulation light whose phase state is alternately switched to "0" and "π/2" to the optical coupler 3. As a consequence, the optical coupler 3 outputs the time-divided coupled light having the two systems for phase diversity, as the coupled light with the reception signal light.

At this time, the local-oscillator modulation light to be inputted to the optical coupler 3 is set as the modulation light using the second clock phase-synchronized with the first clock used for processing in the ADC 5.

Therefore, the ADC 5 samples the digital signal derived from the coupled light having the two systems for the phase diversity without fail. The digital signal processing 6 performs processing for extracting the reception data.

As mentioned above, according to the first embodiment of the present invention, the LO 1 and the phase modulator 2 as the modulator enable the coherent optical reception using a phase diversity system, without using the phase diversity structure shown in FIG. 15. Therefore, advantageously, the structure of the coherent light receiver can be simplified.

Incidentally, according to the first embodiment, the repetitive pattern generator 8*b* divides the frequency of the first clock from the VCO 8*a* into two signal sections and sets the divided signals as the second clock to the phase modulator 2. However, the ADC 5 may be structured by sampling the signals at the rise and fall timings of the first clock from the VCO 8*a*, thereby generating the second clock without dividing the clock signal generated in the VCO 8*a* into two signal sections. Accordingly, the repetitive pattern generator 8*b* shown in FIG. 1 can be omitted.

[A1] Modification of the First Embodiment

The LO 1 and the phase modulator 2 as the modulated local light generator according to the first embodiment are independent components. However, according to the present invention, the LO 1 and the phase modulator 2 can be obviously integrated as one device. According to the present invention, the local-oscillator modulation light can be generated by modulating the frequency, instead of modulating the phase, and then driving the LO 1 may be the local-oscillator modulation light.

As the LO 1, semiconductor lasers such as DFB laser and DBR laser can be applied. For example, a technology for modulating the frequency by modulating drive current of the semiconductor laser is disclosed in a document (Ishida et al., "Pure Frequency Modulation of a Multielectrode Distributed-Bragg-Reflector (DBR) Laser Diode", IEEE Photonics Technology Letters. Vol. 1, No. 7, pp. 156 to 158, on July 1989) and a document (Goodbar and Schiess, "Characterization of the Modulation and Noise Properties of a Three-Electrode DFB Laser, "IEEE Photonics Technique Letters, Vol. 4, No. 5, pp. 414 to 416, on May 1992).

Figure 4:
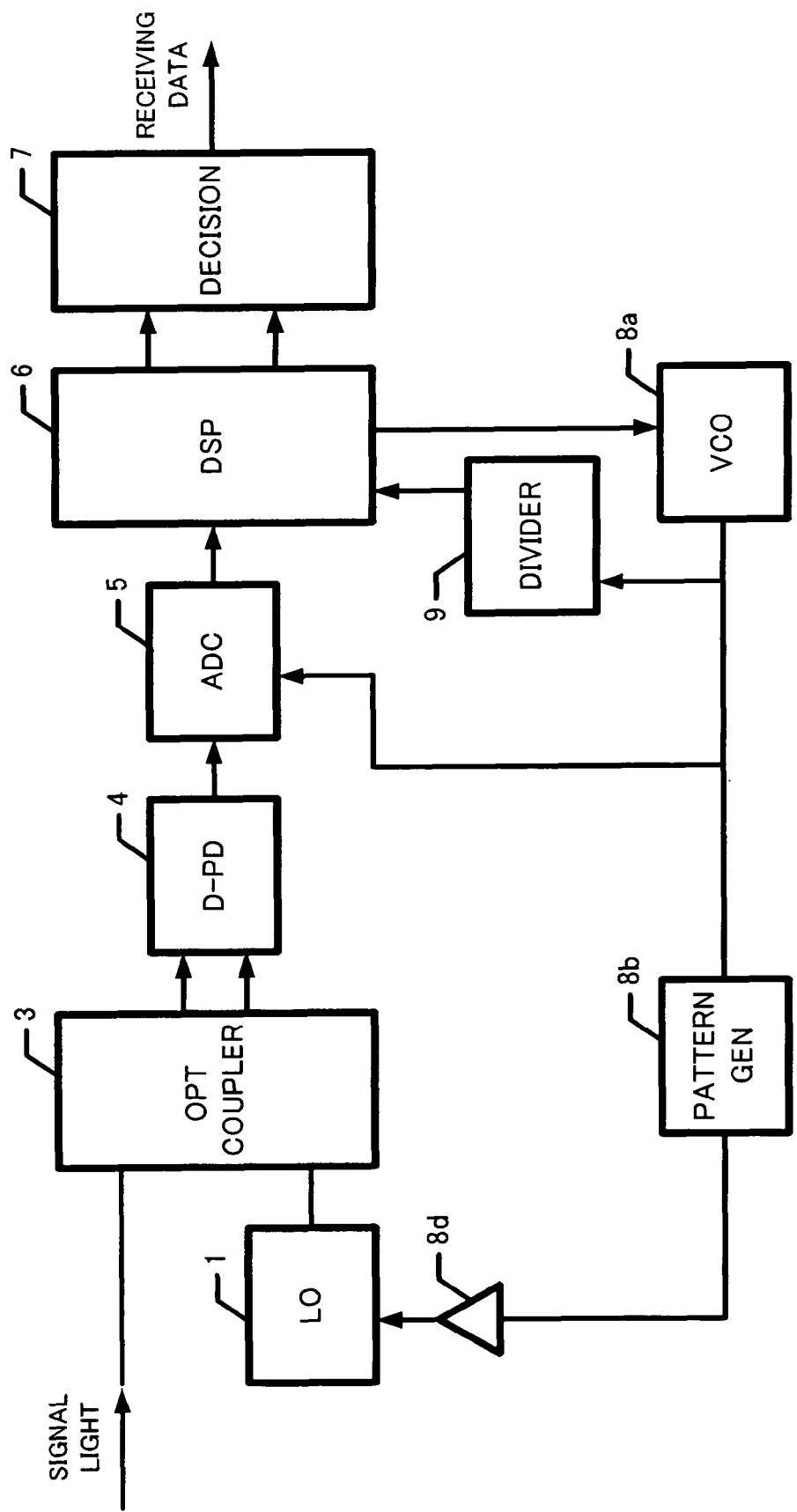
FIG. 4 is a diagram showing a modification of the first embodiment according to the present invention.

That is, referring to FIG. 4, the clock signal from the repetitive pattern generator 8b is set as a sine wave of an anglular frequency $\omega_m$. Then, the amplitude adjustor 8d adjusts the amplitude of the sine signal, and sets a sine signal (second clock) having an amplitude of the maximal amount of frequency deviation as $\pi\omega_m/4$, as a drive signal to an LO 1'. Thus, it is possible to output the local-oscillator modulation light that the optical coupler 3 can output the coupled light substantially equivalent to that in FIG. 1.

With respect of the LO 1' with an optical-anglular frequency $\omega_c$, a frequency is modulated by a sine signal with an amplitude Am and the angle frequency ωm. Then, a photofield of light outputted from the LO 1' changes as a function of time t, as shown in an expression (A). Incidentally, parameter C denotes an amplitude of the photofield and reference numeral $\phi_c$ denotes the phase when t=0.

[Expression 1]

$$y(t) = C\sin((\omega_C + A_m\omega_m\cos(\omega_m t))t + \phi_C) \quad (A)$$
$$= C\sin(\omega_C t + A_m\sin(\omega_m t) + \phi_C)$$

Figure 5:
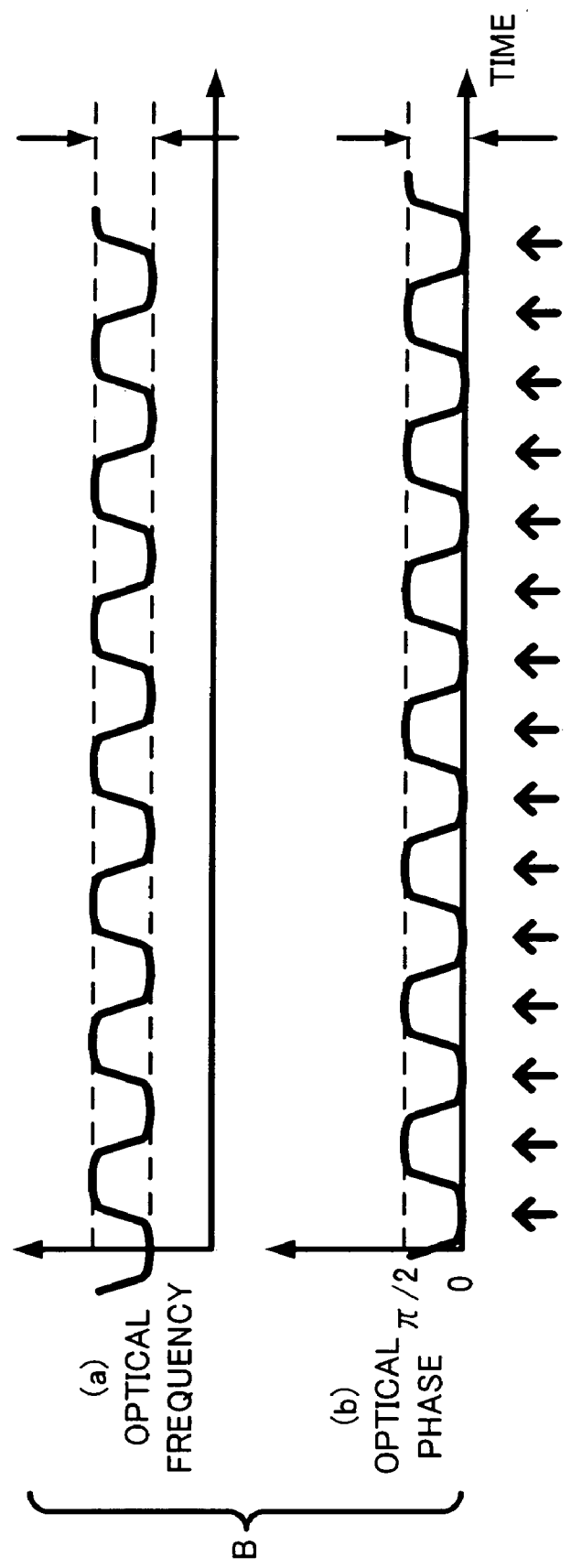
FIG. 5 is an explanatory diagram of the modification of the first embodiment.

As shown by an optical frequency in FIG. 5, the light outputted from the LO 1' is deviated synchronously with the second clock at which an optical frequency is generated by the repetitive pattern generator 8b. As shown in the expression (A), upon modulating the frequency by the sine signal with the amplitude Am and the anglular frequency wm, the amount of deviation can be similar to the phase modulation with an amplitude 2 Am and the modulation frequency ωm. Further, the amount 2 Am of phase swing is substantially π/2 (2 Am=π/2, Amωm=πωm/4). Then, as shown by an optical phase (b) in FIG. 5, the light outputted from the LO 1' can be set as the local-oscillator modulation light for phase diversity that is substantially equivalent to that of the phase modulator 2 shown in FIG. 1.

[B] Second Embodiment

Figure 6:
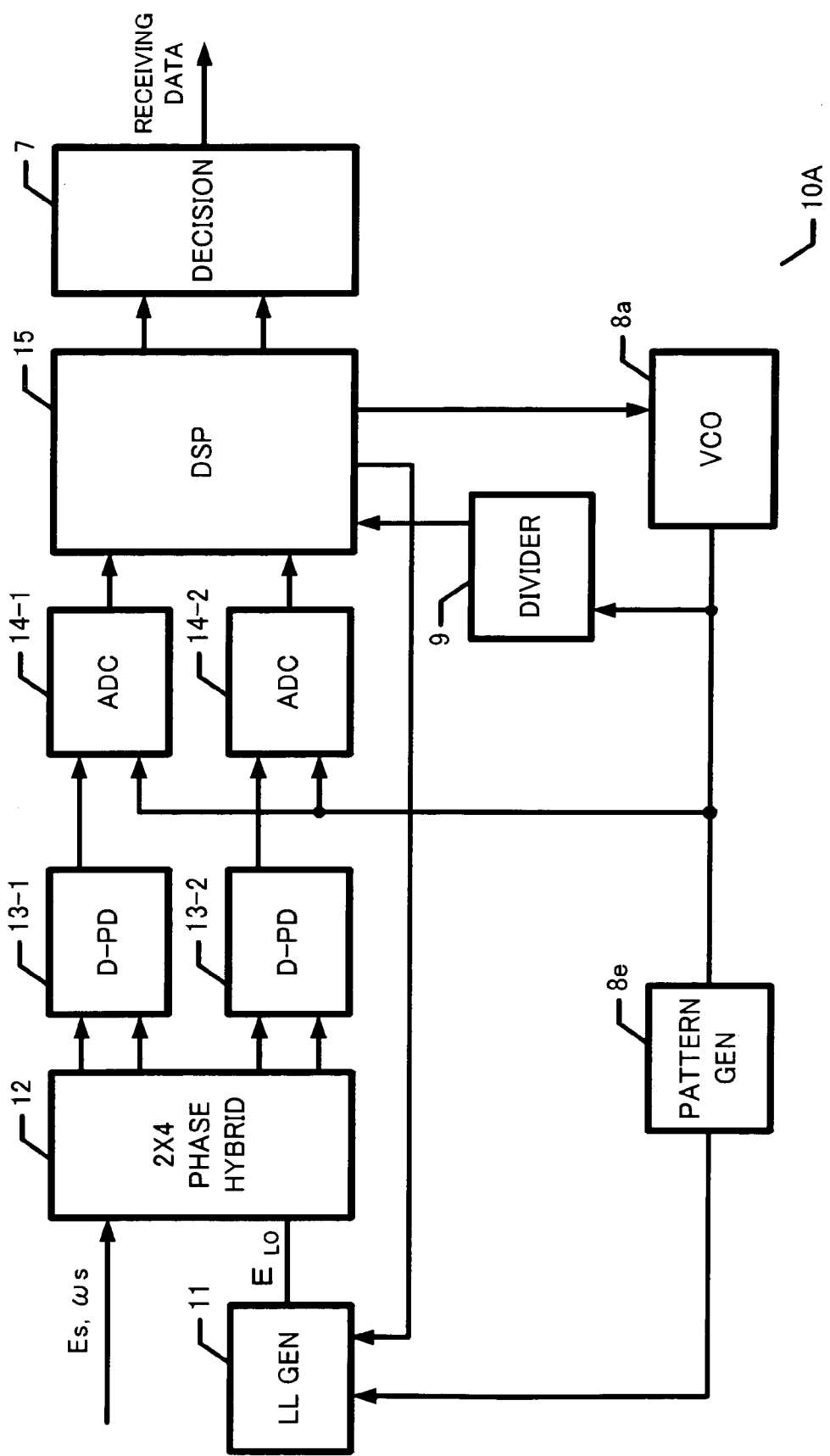
FIG. 6 is a diagram showing a coherent light receiver according to the second embodiment of the present invention.

FIG. 6 is a block diagram showing a coherent light receiver 10A according to the second embodiment of the present invention. The coherent light receiver 10A shown in FIG. 6 can be applied as the receivers 306 shown in FIG. 3, and comprises a modulated local light generator 11 different from a coherent light receiver (refer to reference numeral 200) shown in FIG. 15.

Referring to FIG. 6, the coherent light receiver 10A comprises: the decision 7; the VCO 8a; and the divider 9, which are basically the same as those according to the first embodiment. Further, the coherent light receiver 10A comprises: the modulated local light generator (LL GEN) 11; the 2×4 phase hybrid circuit 12 as an optical mixer; differential photodetectors (D-PD) 13-1 and 13-2 as photoelectric converters; the ADCs 14-1 and 14-2; the digital signal processing 15; and the repetitive pattern generator 8e.

The modulated local light generator 11 outputs the local oscillator light for coherent optical reception as polarization modulation light having two different orthogonal polarization components with a frequency of one integral-th of the first clock from the VCO 8a. Specifically, the modulated local light generator 11 generates local oscillator light $EL_0$ obtained by polarization-multiplexing the polarization component of the optical angular frequency $\omega_L$ and the polarization component of the optical angular frequency $\omega_L + \omega_0$ orthogonal thereto. The use of the polarization-modulated local oscillator light enables the matching of the state of polarizations between the reception signal light and the local oscillator light without providing the polarization controller 20 in the coherent light receiver 10 shown in FIG. 1.

The frequency signal for giving the differential $\omega_0$ in optical angular frequencies between the orthogonal polarization components of the local oscillator light $EL_0$ is inputted from the repetitive pattern generator 8e, and has a band width smaller than twice of the band width of the signal light $E_s$, received by the optical receiver 10A. Further, the frequency signal is larger than that of a spectrum width (full width at half maximum) of a light source for generating the signal light $E_s$ and a spectrum width (full width at half maximum) of a light source for generating the local oscillator light $EL_0$ in an optical transmitter (not shown) (refer to reference numeral 303 in FIG. 3), and is phase-synchronized with the clock signals to the ADCs 14-1 and 14-2, generated by the VCO 8a.

That is, the repetitive pattern generator 8e is a modulation clock supply unit that generates, from the first clock from the VCO 8a, a clock phase-synchronized with the first clock having a frequency $\omega_0$ as one integral-th of the first clock, and outputs the generated clock to the modulated local light generator 11.

Figure 7:
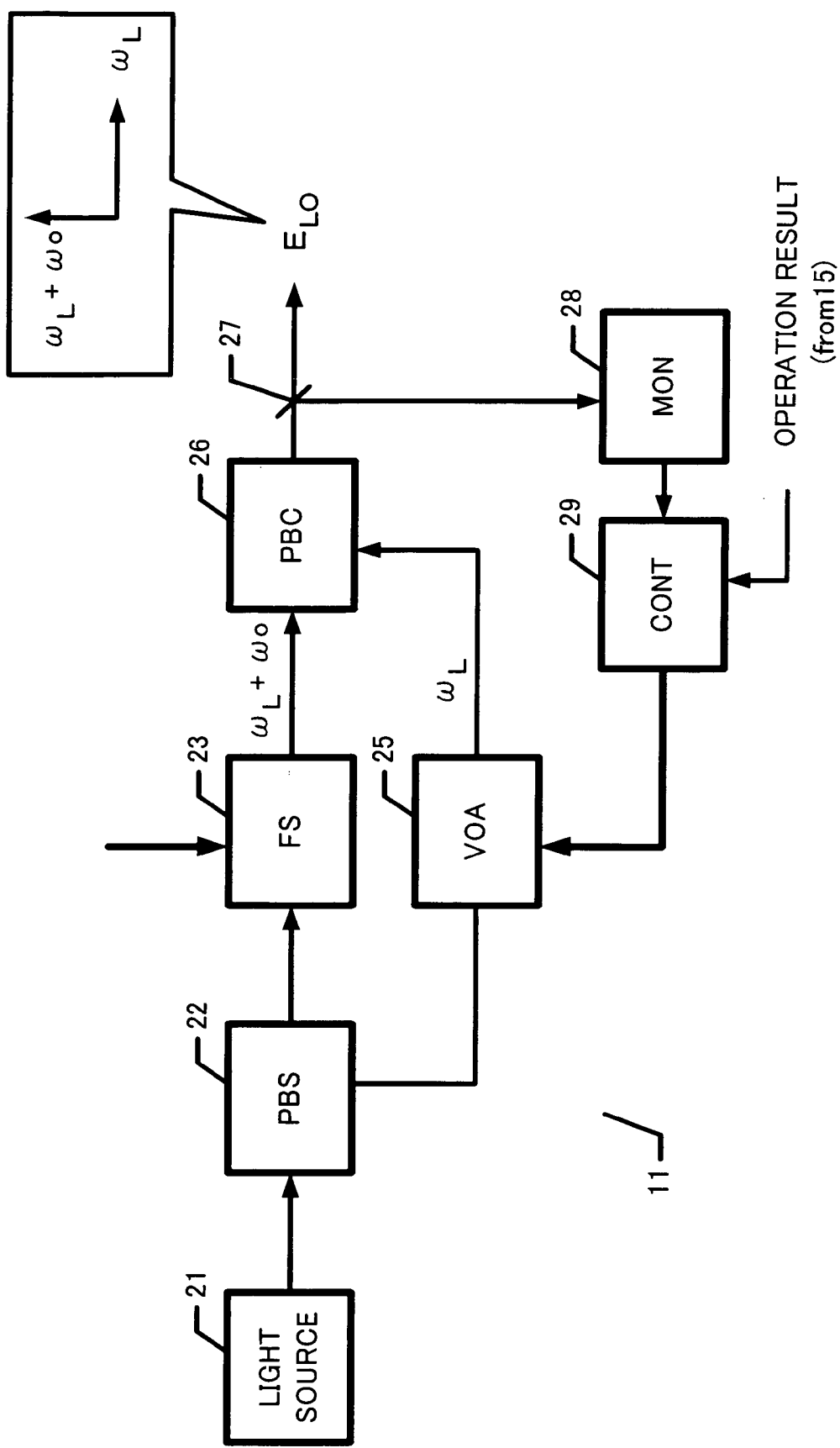
FIG. 7 is a diagram showing a main structure of the coherent light receiver according to the second embodiment.

FIG. 7 is a block diagram showing a specific structure of the modulated local light generator 11. The modulated local light generator 11 comprises: a light source 21; a polarization beam splitter (PBS) 22; a frequency shifter (FS) 23; a variable optical attenuator (VOA) 25; a polarization beam combiner (PBC) 26; an optical splitter 27; a monitor circuit (MON) 28; and an intensity ratio controller (CONT) 29.

The light source 21 generates linear-polarization light with a constant state of polarization having the optical angular frequency $\omega_L$. The spectrum width (full width at half maximum) of the light source 21 is, for example, 100 kHz to 10 MHz.

The PBS 22 splits output light from the light source 21 into two polarization components orthogonal to each other.

Incidentally, when the output light from the light source 21 is linearly polarized, the output light is inputted to the PBS 22 so that the polarization direction is inclined to the optical axis of the PBS 22 by 45 degrees. Further, an optical isolator (not shown) may be arranged between the light source 21 and the PBS 22. Preferably, the optical connection between the light source 21 and the PBS 22 is arranged so that the state of polarization constant is kept constant, by using such as a spatial optical system and polarization maintaining fiber-optics. Incidentally, in place of the PBS 22, a polarization-maintaining-type 1×2 optical splitter can be used.

The frequency shifter 23 receives one of the polarization components outputted from the PBS 22, and shifts the optical angular frequency of input light from the PBS 22 by the angle frequency $\omega_0$ of the frequency signal supplied from the repetitive pattern generator 8e. The frequency shifter 23 can be either a general FM modulator, acousto-optic modulator (AOM), a single side-band (SSB) modulator, or the like.

An example of a frequency $\omega_0$ (=$2\pi\Delta f$) for shifting the frequency by the frequency shifter 23 can be given as follows. When the reception signal light $E_s$ is QPSK or DQPSK signal light with 40 Gbit/s, the signal band width is approximately 20 GHz. Therefore, the signal band width may be smaller than 40 GHz as two times of the signal band width in this case and may be larger than the spectrum width 100 kHz to 10 MHz of the light source 21 in the modulated local light generator 11 (the spectrum width of the signal light source is basically identical thereto). Therefore, the frequency $\Delta f$ in this case can be set within a range of 100 MHz to 1 GHz. However, the present invention is not limited to the examples.

The VOA 25 receives the other polarization component outputted from the PBS 22, and attenuates the intensity of the input light. The amount of attenuation of the VOA 25 is variably controlled in accordance with an output from the intensity ratio controller 29, which will be described later.

The PBC 26 receives the polarization component of the optical angular frequency $\omega_L+\omega_0$ outputted from the frequency shifter 23 and the polarization component of the optical angular frequency outputted from the VOA 25, and generates the local oscillator light $EL_0$ obtained by polarization-multiplexing the polarization components.

Incidentally, the light source 21, the PBS 22, the frequency shifter 23, the VOA 25, and the PBC 26 are optically coupled with, e.g., a polarization maintaining fiber, an optical waveguide, or a spatial optical system, thereby maintaining the states of polarization of the propagated light therebetween.

Further, the one polarization component outputted from the PBS 22 is inputted to the frequency shifter 23 and the other polarization component is inputted to the VOA 25.

However, the actual structure is not limited to this, and both the frequency shifter 23 and the VOA 25 can be applied to the one polarization component outputted from the PBS 22.

In this case, the output from the PBS 22 may be connected to the input of the frequency shifter 23, and the output from the frequency shifter 23 may be connected to the input of the VOA 25. On the hand, the output from the PBS 22 may be connected to the input of the VOA 25, and the output from the VOA 25 may be connected to the input of the frequency shifter 23.

Further, the VOA 25 may be an optical amplifier, in place of the optical attenuator.

Furthermore, for both the polarization components outputted from the PBS 22, the frequency shifter 23 and a frequency shifter 23a (not shown) can be simultaneously provided to set the difference in anglular frequencies between signals for driving the frequency shifter 23 and the frequency shifter 23a to be $\omega_0$.

The optical splitter 27 branches a part of the local oscillator light $E_{LO}$ outputted from the PBC 26 as monitoring light, and outputs the branched light to the monitor circuit 28.

The monitor circuit 28 detects the intensity (amplitude) of the polarization components of the optical angular frequen-cies $\omega_L$ and $\omega_L+\omega_0$ included in the local oscillator light $E_{LO}$ by using the monitoring light from the optical splitter 27, and monitors a ratio thereof.

The intensity ratio controller 29 generates a control signal for changing the amount of attenuation of the VOA 25 in accordance with the monitoring result of the monitor circuit 28 and an operation result of the digital signal processing 15, which will be described later, and outputs the control signal to the VOA 25. Incidentally, the details will be given later of the control of the VOA 25 using the intensity ratio controller 29.

The 2×4 phase hybrid circuit 12 (in FIG. 6) is an optical mixer for mixing the local-oscillator modulation light from the modulated local light generator 11 and the reception signal light, and comprises a 90-degree phase hybrid circuit having two input ports and four output ports, similarly to reference numeral 202 shown in FIG. 15. Herein, one input port of the 2×4 phase hybrid circuit 12 receives the reception signal light $E_s$ of the optical angular frequency $\omega_s$ to be inputted to the optical receiver 10A via an optical line from an optical transmitter (not shown), and the other input port of the 2×4 phase hybrid circuit 12 receives the local oscillator light $E_{LO}$ to be outputted from the modulated local light generator 11. The 2×4 phase hybrid circuit 12 combines the reception signal light $E_s$ to be inputted and the local oscillator light $E_{LO}$, and outputs two pairs of light with optical phases different from each other by 90 degrees. Herein, the optical phases to be outputted from two output ports as one pair on the top in FIG. 6 are 0 degree and 180 degrees, and the optical phases to be outputted from two output ports as the other pair on the bottom in FIG. 6 are 90 degrees and 270 degrees.

The differential photodetector 13-1 is a photoelectric converter that photoelectrically converts the light of the coupled signal obtained by coupling with the 2×4 phase hybrid circuit 12. Specifically, the differential photodetector 13-1 receives light having the optical phases with 0 degree and 180 degrees outputted from the 2×4 phase hybrid circuit 12, and detects the differential photoelectrical conversion (balanced detection). Further, the differential photodetector 13-2 receives light having the optical phases with 90 degrees and 270 degrees outputted from the 2×4 phase hybrid circuit 12, and detects the differential photoelectrical conversion. The reception signals detected by the differential photodetectors 13-1 and 13-2 are amplified and normalized by an AGC amplifier (not shown).

The ADCs 14-1 and 14-2 convert analog reception signals inputted from the differential photodetectors 13-1 and 13-2 into the digital signals and output the digital signals to the digital signal processing 15.

The digital signal processing 15 executes operation processing under an algorithm, which will be described in details, by using the digital signals from the ADCs 14-1 and 14-2, thereby performing signal processing for coherently receiving the signal light $E_s$ by using the local oscillator light $E_D$) set within the range of the differential $\omega_0$ in optical angular frequencies between the orthogonal polarization components.

The decision 7 executes data decision processing of the reception signal on the basis of the operation result of the digital signal processing 15, and outputs a recovered data signal indicating the result.

Next, a description will be given of the coherent light receiver 10A having the above-mentioned structure.

First, the operation principle of the optical receiver will be specifically described. The signal light $E_s$ received by the optical receiver 10A is expressed by an electrical-field vector $E_s(t)$ shown by, e.g., the following expression (1).

[Expression 2]

$$\vec{E}_S(t) = \{A_x \vec{e}_x + A_y \vec{e}_y\} e^{j(\omega t + \phi(t))} s(t) \quad (1)$$

In the expression (1), s(t) denotes a signal vector corresponding to data of the reception signal light, ex(t) denotes a unit vector in the x direction, ey(t) denotes a unit vector in the y direction, Ax denotes an amplitude of the x polarization component of the reception signal light, Ay denotes an amplitude of the y polarization component of the reception signal light, ω denotes an average optical angular frequency ($=\omega_s$) of the reception signal light, φ(t) denotes optical phase fluctuation of the reception signal light, t denotes time, and j denotes an imaginary unit.

Further, the local oscillator light $E_{LO}$ outputted from the modulated local light generator 11 is expressed by, e.g., an electrical-field vector $E_{LO}(t)$ represented by the following expression (2).

[Expression 3]

$$\vec{E}_{LO}(t) = (A_{LO\_x} \vec{e}_x + A_{LO\_y} e^{j\Delta\omega x} \vec{e}_y) e^{j(\omega_{LO} t + \phi_{LO}(t) + \phi_0)} \quad (2)$$

In the expression (2), $A_{LO\_x}$ denotes an amplitude of the x polarization component of the local oscillator light, $A_{LO\_y}$ denotes an amplitude of the y polarization component of the local oscillator light, $\omega_{LO}$ denotes an average optical angular frequency of the local oscillator light, Δω denotes a difference ($=\omega_0$) in optical angular frequencies between the orthogonal polarization components of the local oscillator light, $\phi_{LO}(t)$ denotes optical phase fluctuation of the local oscillator light, and $\phi_0$ denotes the initial phase of the local oscillator light.

After combining the reception signal light $E_s$ and the local oscillator light $E_{LO}$ by the 2×4 phase hybrid circuit 12, the differential photodetectors 13-1 and 13-2 perform photoelectrical conversion of the combined light, and complex current that is normalized by the amplification of the AGC amplifier is defined by the following expression (3). A real part I of the complex current corresponds to an output of one differential photodetector 13-1, and an imaginary part Q corresponds to an output of the other differential photodetector 13-2.

[Expression 4]

$$\begin{aligned} I + jQ &= a\vec{E}_S \cdot \vec{E}_{LO}^* \\ &= \{A'_x e^{j(\alpha x + \phi(t) - \omega_{LO} t - \phi_{LO}(t) - \phi_0)} + \\ &\quad A'_y e^{j(\alpha x + \phi(t) - \omega_{LO} t - \phi_{LO}(t) - \phi_0 - \Delta\alpha x)}\} s(t) \\ &\equiv (A'_x e^{j\theta_x(t)} + A'_y e^{j\theta_y(t)}) s(t) \\ &= e^{j\theta_x(t)} (A'_x + A'_y e^{j(\theta_y(t) - \theta_x(t))}) s(t) \\ &= e^{j\theta_x(t)} (A'_x + A'_y e^{-j\Delta\alpha x}) s(t) \end{aligned} \quad (3)$$

Incidentally, in the expression (3), θx(t) denotes the phase difference between the x polarization components, and θy(t) denotes the phase differential between the y polarization components. Further, Ax' and Ay' satisfy a relation of the following expression (4) by setting gain of the AGC amplifier as g (positive).

[Expression 5]

$$A_x'^2 + A_y'^2 = 1$$

$$A_x' = gA_x A_{LO\_x}$$

$$A_y' = gA_y A_{LO\_y} \quad (4)$$

Next, in the expression (3), a term derived from the x polarization component is focused, and carrier on the sending side, the frequency differential between the local oscillator light, and a relative phase noise are compensated. Thus, complex current I'+jQ' after the compensation is expressed by the following expression (5).

[Expression 6]

$$\begin{aligned} I' + jQ' &= \vec{E}_S \cdot \vec{E}_{LO}^* \cdot e^{j\theta_x(t)} \\ &= (A_x + A_y e^{-j\Delta\omega t}) s(t) \end{aligned} \quad (5)$$

Herein, an example of the compensating method will be described. Complex current signals outputted from the differential photodetectors 13-1 and 13-2 can include the polarization rotation due to the phase deviation and the mismatch in frequency between the local oscillator light and the carrier of the signal light and the polarization rotation, and the mismatch therefore needs to be compensated. As a technology relating to the compensation, e.g., in a document: D-S. Ly-Gagnon et al., "Unrepeated 210-km transmission with coherent detection and digital signal processing of 20-Gb/s QPSK signal", OFC 2005, OTuL4., when the reception signal light is based on a four-valued phase shift keying (PSK) system, a method for calculating the phase differential θ(t) between the reception signal light and the local oscillator light is shown. By an obvious extension of this method, approximation of the phase difference θ(t) is given under a relation of the following expression (6) in an m-valued PSK system.

[Expression 7]

$$\theta(t) \cong \frac{1}{m} \frac{1}{\Delta t} \int_{-\Delta t} \arg\{(I + jQ)^m\} dt \quad (6)$$

Then, according to the present invention, by referring to the relation of the expression (6), approximate values of the phase difference θx(t) of the x polarization component and the phase differential θy(t) of the y polarization component included in the expression (3) are calculated by the following expression (7).

[Expression 8]

$$\theta_x(t) \cong \frac{1}{m} \frac{1}{\Delta t} \int_{-\Delta t} \arg\{(I + jQ)^m\} dt$$

$$\theta_y(t) \cong \frac{1}{m} \frac{1}{\Delta t} \int_{-\Delta t} \arg\{\{(I + jQ)e^{-j\Delta\alpha x}\}^m\} dt \quad (7)$$

At this time, in the expression (7), an integration duration Δt needs to be much larger than the reciprocal of the frequency difference between the orthogonal polarization components of the local oscillator light, i.e., 2π/Δω, and further needs to be much smaller than the reciprocal of the maximal value of the frequency difference between the average frequency of the reception signal light and the average frequency of the local oscillator light, i.e., 1/max (|$\omega_{LO} - \omega_s$|/2π). Incidentally, when the reception signal light is based on the DQPSK system, m is 4.

Incidentally, the compensating method is one example and another compensating method can be applied to the present invention.

In the expression (7), the approximate values of θx(t) and θy(t) are calculated. Then, a rate of Ax' and Ay' included in the expression (3) is approximately obtained by the following expression (8).

[Expression 9]

$$A_x':A_y' \cong \int_{-T} |e^{-j\theta_x(t)}(I+jQ)|dt : \int_{-T} |e^{-j\theta_y(t)}(I+jQ)|dt \quad (8)$$

However, integration time T in the expression (8) needs to be much larger than a reciprocal $2\pi/\Delta\omega$ of the frequency differential between the orthogonal polarization components of the local oscillator light.

By using the rate of Ax' and Ay' obtained under the relation of the expression (8) and the relation of $Ax'^2+Ay'^2=1$ represented in the expression (4), values of Ax' and Ay' can be calculated.

Therefore, if the values of Ax' and Ay' are given, values of I' and Q' in the expression (5) are given by current values outputted from the differential photodetectors 13-1 and 13-2. Further, a value of $\Delta\omega t$ is given by a value $(\Delta\omega_t=\omega_0=2\pi\Delta f)$ corresponding to the frequency $\Delta f$ of the oscillator 24. Therefore, with the following expression (9) for solving the relation in the expression (5) with respect to s(t) and setting the denominator to be rational, the signal vector s(t) can be calculated. The signal vector s(t) corresponds to an estimation result of an amplitude and a phase of an electrical field of the reception signal light outputted from the digital signal processing 15.

[Expression 10]

$$s(t) = \frac{I' + jQ'}{A'_x + A'_y e^{-j\Delta\omega t}} \quad (9)$$

$$= \frac{A'_x + A'_y e^{j\Delta\omega t}}{1 + 2A'_x A'_y \cos\Delta\omega t}(I' + jQ')$$

Therefore, on the basis of the operation value of the signal vector s(t), the decision 7 executes data decision processing in accordance with a threshold corresponding to a modulation format of the reception signal light, and the reception data can be recovered.

However, since the relation in the expression (9) is diverged under a condition represented by the following expression (10), a solution for preventing this state is required.

[Expression 11]

$$1 + 2A'_x A'_y \cos\Delta\omega t = 0 \quad (10)$$

$$\Rightarrow \cos\Delta\omega t = -\frac{1}{2A'_x A'_y}$$

A condition that the expression (10) has real roots is represented by the following expression (11).

[Expression 12]

$$1 \leq \frac{1}{2A'_x A'_y} \leq +1 \quad (11)$$

$$\Rightarrow A'_x A'_y \geq \frac{1}{2} \text{ or } A'_x A'_y \leq -\frac{1}{2}$$

Herein, with $Ax'^2+Ay'^2=1$ represented by the expression (4), relations of $0 \leq Ax' \leq 1$ and $0 \leq Ay' \leq 1$ are established. In consideration of the relations, the only condition that satisfies the expression (11) is given by the following expression (12).

[Expression 13]

$$A'_x = A'_y = \frac{\sqrt{2}}{2} \quad (12)$$

Therefore, when values of Ax' and Ay' calculated with the expression (4) and expression (8) are close to the condition represented by the expression (12), e.g., by changing a rate of an amplitude $A_{LO\_x}$ of the x polarization component of the local oscillator light and an amplitude $A_{LO\_y}$ of the y polarization component, it is possible to prevent a state in which the relation in the expression (9) diverges and the signal vector s(t) cannot be operated.

Based on the above-mentioned operation principle, next, a description will be given of a specific operation of the optical receiver 10A.

In the optical receiver, the modulated local light generator 11 sends, to the PBS 22, the light with the optical angular frequency $\omega_L$ outputted from the light source 21, and splits the light into the orthogonal polarization components. Further, one of the polarization components (e.g., the y polarization component) is inputted to the frequency shifter 23, thereby shifting the optical angular frequency by $\omega_0$. The other polarization component (e.g., the x polarization component) is inputted to the VOA 25, thereby adjusting the intensity (amplitude).

Subsequently, the PBC 26 receives the polarization component of the optical angular frequency $\omega_L+\omega_0$ outputted from the frequency shifter 23 and the polarization component of the optical angular frequency $\omega_L$ outputted from the VOA 25, thereby generating the local oscillator light $E_{LO}$ obtained by polarization-multiplexing the orthogonal polarization components with the differential $\omega_0$ in optical angular frequencies. Further, the local oscillator light $E_L$ is transmitted to the 2×4 phase hybrid circuit 12, is partly branched by the optical splitter 27, and is transmitted to the monitor circuit 28. The monitor circuit 28 monitors the ratio of the intensities (amplitudes) of the polarization component included in the local oscillator light $E_{LO}$ and transmits the monitoring result to the intensity ratio controller 29. The intensity ratio controller 29 changes the amount of attenuation of the VOA 25 in accordance with the monitoring result of the monitor circuit 28 and the operation result of the digital signal processing 15 when the operation values of Ax' and Ay' are close to the condition of the expression (12). As a consequence, the ratio of intensities between the orthogonal polarization components of the local oscillator light $E_{LO}$ is changed, thereby preventing the diverging of the expression (9).

The local oscillator light $E_{LO}$ inputted to the 2×4 phase hybrid circuit 12 is combined to the reception signal light $E_s$ having the optical angular frequency $\omega_s$. The light with the optical phases having 0 degree and 180 degrees is outputted to the differential photodetector 13-1, and the light with the optical phases having 90 degrees and 270 degrees is outputted to the differential photodetector 13-2. The differential photodetectors 13-1 and 13-2 detect the photoelectrical conversion of the difference between the output light from the 2×4 phase hybrid circuit 12. As a consequence, the differential photodetector 13 outputs a signal I having an intermediate frequency $\omega_t$ due to the beat of the polarization component (the x polarization component) of the optical angular frequency $\omega_L$ included in the local oscillator light $E_{LO}$ and the x polarization component of the reception signal light $E_s$. The differential photodetector 13 outputs a signal Q having an intermediate frequency $\omega_t+\omega_0$ due to the beat of the polarization component (the y polarization component) of the optical angular frequency $\omega_L+\omega_0$ included in the local oscillator light $E_{LO}$ and the y polarization component of the reception signal light $E_s$.

Figure 8:
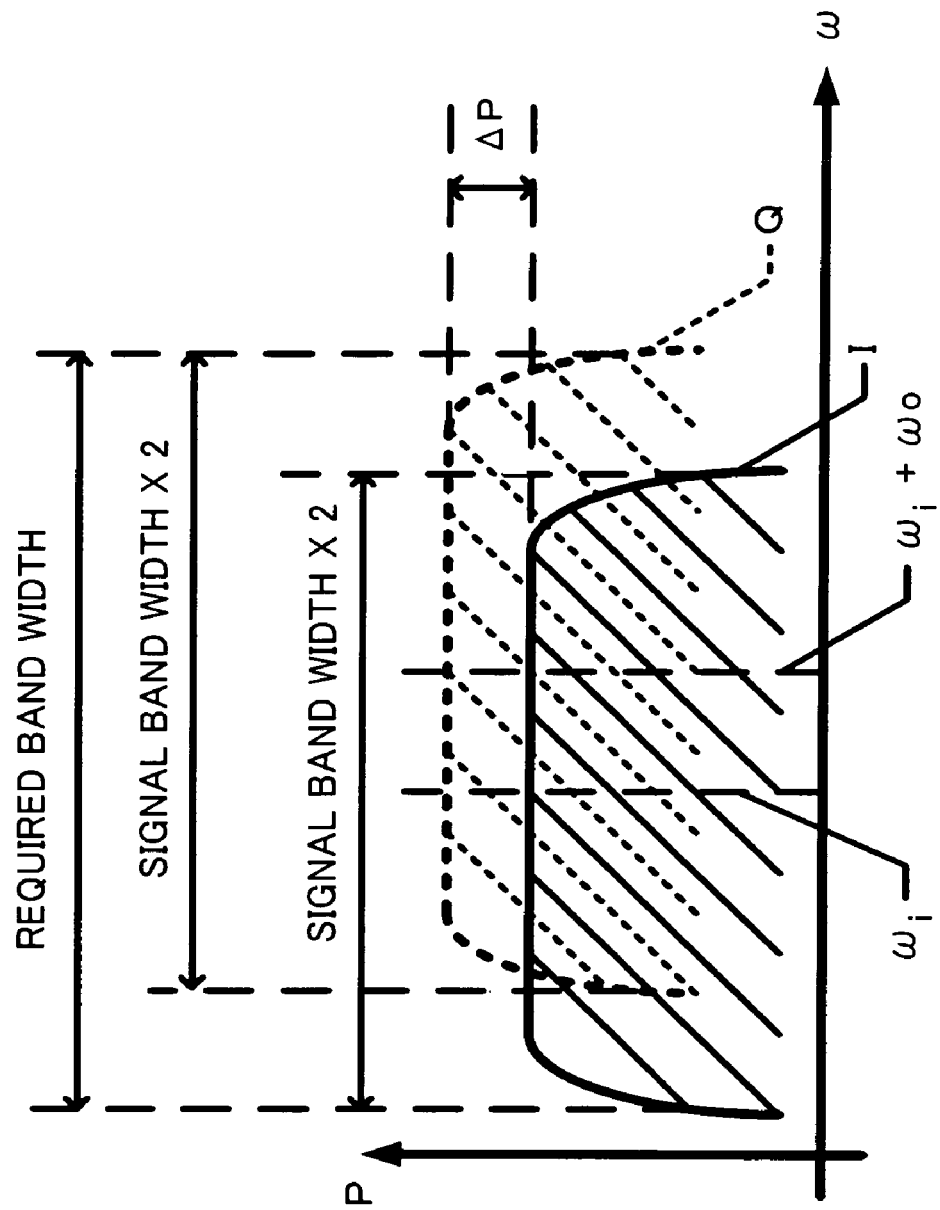
FIG. 8 is an explanatory diagram of operations and advantages of the coherent light receiver according to the second embodiment.
Figure 16:
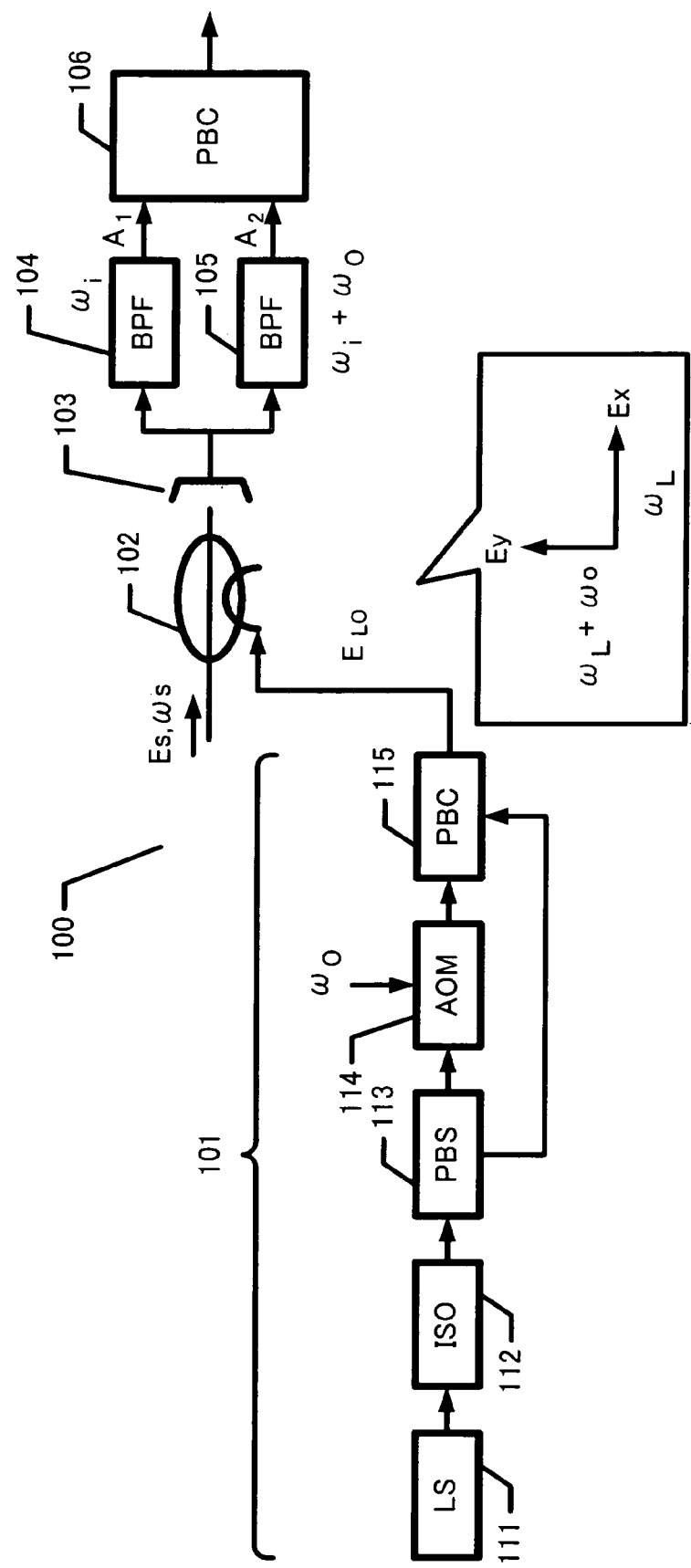
FIG. 16 is a diagram showing an example of the structure of a conventional coherent light receiver.
Figure 17:
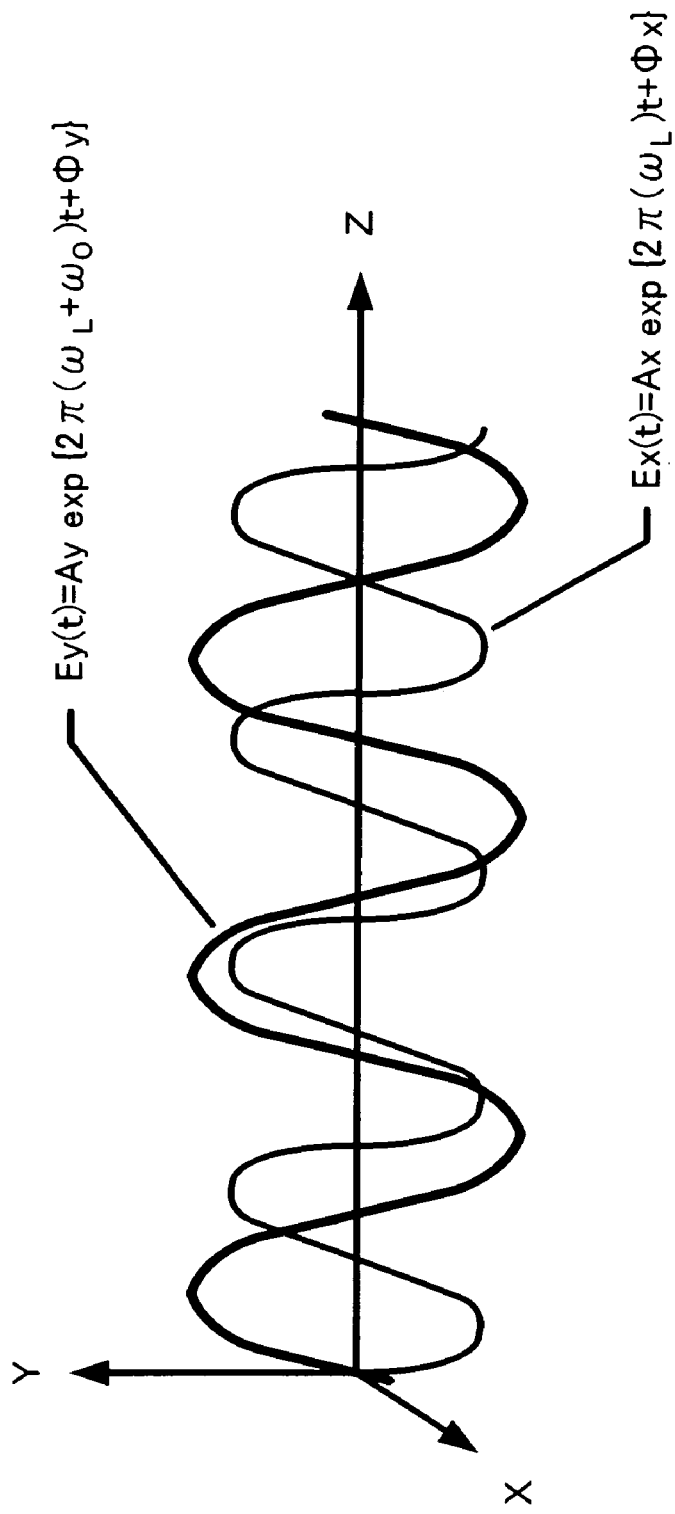
FIG. 17 is a conceptual diagram showing an orthogonal polarization component of local oscillator light in the conventional coherent light receiver.
Figure 18:
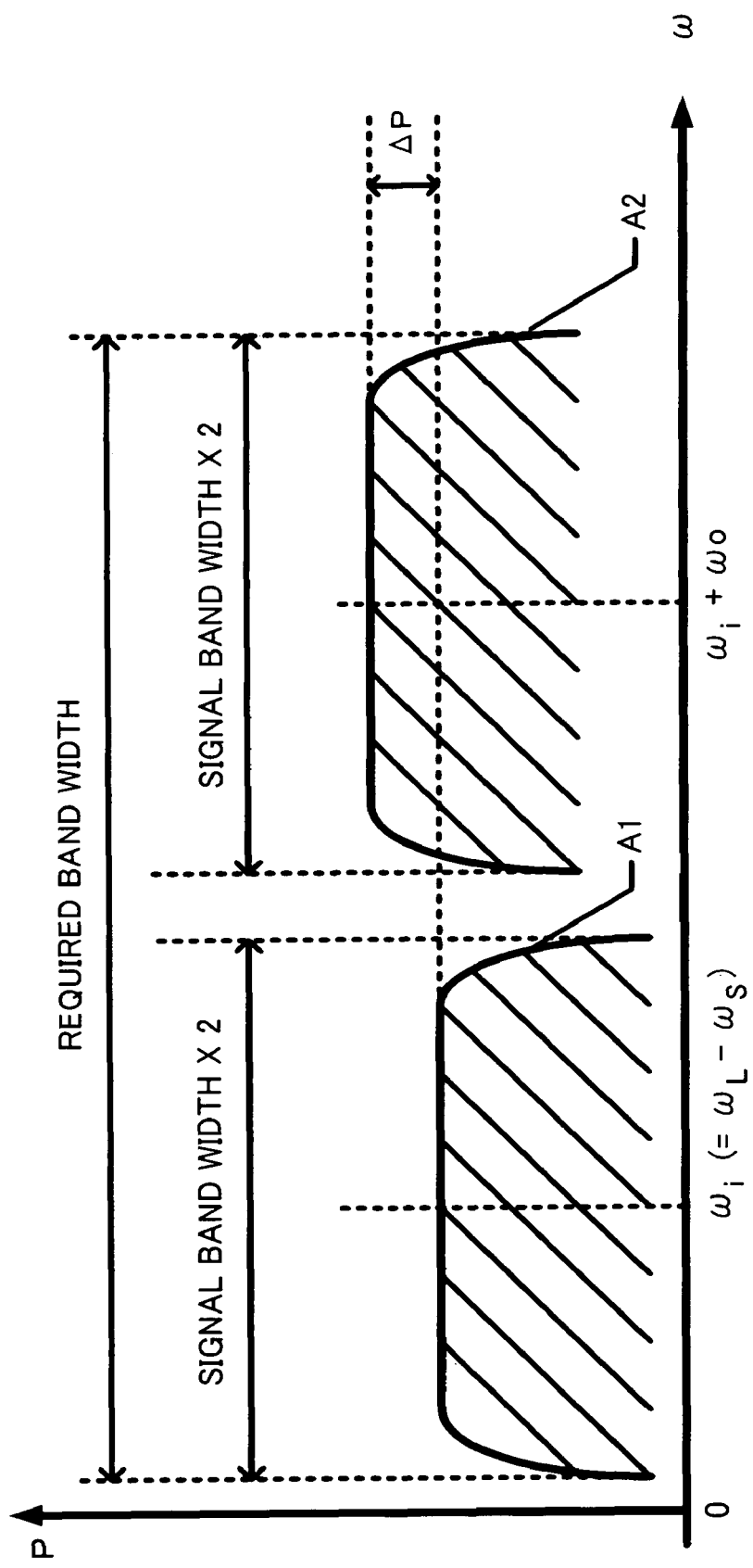
FIG. 18 is a diagram schematically showing electrical spectra of an intermediate-frequency signal in the conventional coherent light receiver.

FIG. 8 is a schematic diagram of electrical spectra of the intermediate-frequency signals I and Q. The intermediate-frequency signals I and Q have the frequency difference smaller than two times of the signal band width and further has a spectrum width larger than those of the signal light source and the local oscillator. Therefore, the spectra are overlapped on the frequency axes. As a consequence, in the example shown in FIG. 8, band widths required to the differential photodetectors 13-1 and 13-2 and an electrical circuit arranged at the latter stage may not be larger than two times of the signal band width. Although not shown, upon setting the optical angular frequency $\omega_L$ of the local oscillator light so that the frequency $\omega_i$ is approximate to 0 Hz, the required band width can be narrowed to the signal band width. When the spectra of the intermediate-frequency signals I and Q are overlapped, with the conventional coherent light receiver 100 shown in FIG. 16, the intermediate-frequency signals I and Q cannot be split with band pass filters. However, according to the present invention, under the above-mentioned operation principle, the intermediate-frequency signals I and Q are subjected to the digital signal processing, thereby splitting the intermediate-frequency signals I and Q.

Specifically, the intermediate-frequency signals I and Q outputted from the differential photodetectors 13-1 and 13-2 are A/D converted by the ADCs 14-1 and 14-2 at a high rate, and the digital signal systems corresponding to the intermediate-frequency signals I and Q are inputted to the digital signal processing 15. The digital signal processing 15 executes the digital signal processing with a series of expression (1) to expression (9), thereby operating the signal vector s(t). Further, the values of Ax' and Ay' obtained in the operation processing are close to the condition in the expression (12), and the information is then transmitted from the digital signal processing 15 to the intensity ratio controller 29 in the modulated local light generator 11. The intensity ratio controller 29 controls the VOA 25, thereby changing the ratio of intensities between the orthogonal polarization components of the local oscillator light $E_{LO}$. It is possible to prevent the expression (9) from diverging and further prevent an impossible state of the operation of the signal vector s(t).

Further, when the operation value of the signal vector s(t) is transmitted to the decision 7 in the digital signal processing 15, the decision 7 executes, in accordance with the threshold corresponding to the modulation system of the reception signal light, decision processing for determining to which data value the operation value of the signal vector s(t) corresponds, and outputs the decision result to the reception data.

With the optical receiver 10A, the AD conversion and the digital signal processing of the reception signal are combined and the setting of the difference $\omega_0$ in optical angular frequencies between the orthogonal polarization components of the local oscillator light $E_{LO}$ is optimized. As compared with the system according to the conventional technology (III), the band widths required to the differential photodetectors 13-1 and 13-2 are greatly reduced. It is possible to coherently receive the signal light at a high rate, e.g., 40 Gbit/s or more without depending on the state of polarization.

Further, as compared with the system according to the conventional technologies (I) and (II), the simple structure enables the coherent reception without depending on the polarization, thereby providing an optical receiver with a small size.

In the digital signal processing 15, upon operating the signal vector s(t), as represented by the expression (9), it is necessary to operate trigonometrical functions $\sin \Delta\omega t$ and $\cos \Delta\omega t$ with respect to the frequency difference $\Delta\omega$ to be given to one of the polarization components. If supplying the frequency signal for giving the frequency difference from an independent oscillation circuit, a setting value of $\Delta\omega t$ is within a constant range. In the digital signal processing 15, it is considered to be necessary to store in advance the values of the trigonometrical function $\sin \Delta\omega t$ and $\cos \Delta\omega t$ with a table structure in accordance with the oscillation frequency of the oscillation circuit. In this case, the number of gates of the digital signal processing 15 is necessarily increased.

Figure 9:
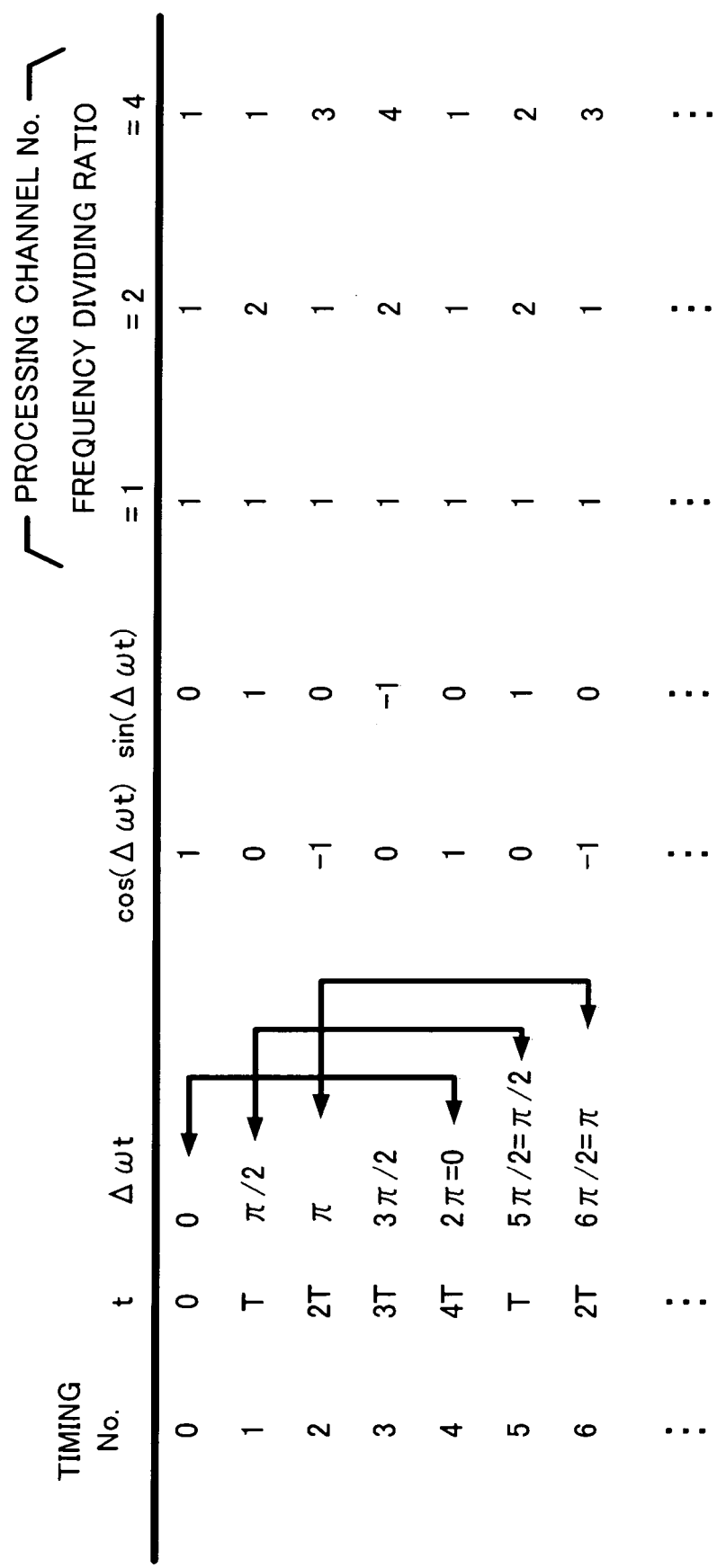
FIG. 9 is an explanatory diagram of operations and advantages of the coherent light receiver according to the second embodiment.

In the coherent light receiver 10A according to the second embodiment, as shown in FIG. 9, a third clock obtained by dividing the clock signal generated by the VCO 8a by one integral-th is set as the frequency signal for prescribing the frequency difference to be given. Accordingly, the values of the $\sin \Delta\omega t$ and $\cos \Delta\omega t$ at the sampling timing in the ADCs 14-1 and 14-2 have regularity and the operation of signal vector s(t) at the sampling timing is greatly simplified.

Herein, the case shown in FIG. 9 represents that sampling frequencies of the ADCs 14-1 and 14-2 (i.e., the frequency of the first clock from the VCO 8a) is 1/T and the repetitive pattern generator 8e divides the clock signal from the VCO 8a into the fourth order subharmonic. Referring to FIG. 9, upon sampling the signals in the ADCs 14-1 and 14-2 in order of timing numbers #0, #1, #6, the sampling time is expressed with T as 0, T, . . . 6T.

At this time, $\Delta\omega = \frac{1}{4}$ T is obtained and $\Delta\omega t$ at the timing numbers #0 to #6 then increases by $\pi/2$ starting from 0. Therefore, the value of $\cos \Delta\omega t$ at timing numbers #0 to #6 are sequentially 1, 0, −1, 0, 1, 0, and −1. Obviously, four values (1, 0, −1, 0) form a cyclic sequence after the timing number #7. Similarly, the value of $\sin \Delta\omega t$ at is timing number #0 to #6 is sequentially 0, 1, 0, −1, 0, and 1. Obviously, four values (0, 1, 0, −1) form a cyclic sequence after the timing number #7.

Therefore, if setting the frequency dividing ratio of the divider 9 as "1", the values of $\sin \Delta\omega t$ and $\cos \Delta\omega t$ do not need to be stored with the table structure in the operation of the digital signal processing 15. With respect to the values of $\sin \Delta\omega t$ and $\cos \Delta\omega t$, values of a simple cyclic sequence may be derived. Therefore, the operation can be greatly simplified.

Further, if setting the frequency dividing ratio of the divider 9 as "2" and further setting the operation of the digital signal processing 15 to be 2-parallelization with channels ch.1 and ch.2, the channels ch.1 and ch.2 alternately perform the operation of the signal vector s(t) on the basis of the digital signal that is inputted at the sampling timing. Therefore, the values of $\sin \Delta\omega t$ and $\cos \Delta\omega t$ for every channel ch.1 and ch.2 can be simply assigned.

That is, as shown in FIG. 9, $\sin \Delta\omega t$ assigned in the operation of the signal vector s(t) with the channel ch.1 forming the digital signal processing 15 has a fixed value 0, and $\cos \Delta\omega t$ has binary values (1, −1) alternately appearing. On the other hand, $\sin \Delta\omega t$ assigned in the operation of the signal vector s(t) with the channel ch.2 has binary values (1, −1) alternately appearing and $\cos \Delta\omega t$ has a fixed value 0.

Further, if setting the frequency dividing ratio of the divider 9 as "4" and further setting the clock signals obtained by the division of the frequency signal generated by the repetitive pattern generator 8e and the divider 9 to have the substantially the same frequency, channels ch.1 to ch.4 enable the operation of the digital signal processing 15 to be 4-parallelization. The values of $\sin \Delta\omega t$ and $\cos \Delta\omega t$ can be more simply assigned for the channels ch.1 to ch.4.

In this case, $\Delta\omega t$ always has the same point on the phase plane for the channels ch.1 to ch.4. Therefore, the values of sine and cosine always are fixed. That is, sin $\Delta\omega t$ individually has a fixed value 0, 1, 0, and −1 and cos $\Delta\omega t$ individually has a fixed value 1, 0, −1, and 0 for the channels ch.1 to ch.4.

Incidentally, the frequency signal generated by the repetitive pattern generator 8e is not limited to ¼ of the clock signal frequency from the VCO 8a. In this case, the clock signal obtained by the frequency division of the divider 9 matches the frequency of the frequency signal generated by the repetitive pattern generator 8e, thereby setting the values of sin $\Delta\omega t$ and cos $\Delta\omega t$ used for the operation of the digital signal processing 15 as fixed values.

As a consequence, in the expression (9) for obtaining the signal vector s(t), the term of cos $\Delta\omega t$ (if adding $\Delta\phi_0$, cos $(\Delta\omega t - \Delta\phi_0)$) as the denominator and the term of $e^{j\Delta\omega t}$ (adding $\Delta\phi_0$, $e^{j(\Delta\omega t - \Delta\phi_0)}$) as the numerator are constants for every channel. Therefore, the calculation load can be greatly reduced. Particularly, the divider 9 and the repetitive pattern generator 8e are shared, thereby simplifying the operation of the digital signal processing 15 and further simplifying the apparatus structure.

Figure 10:
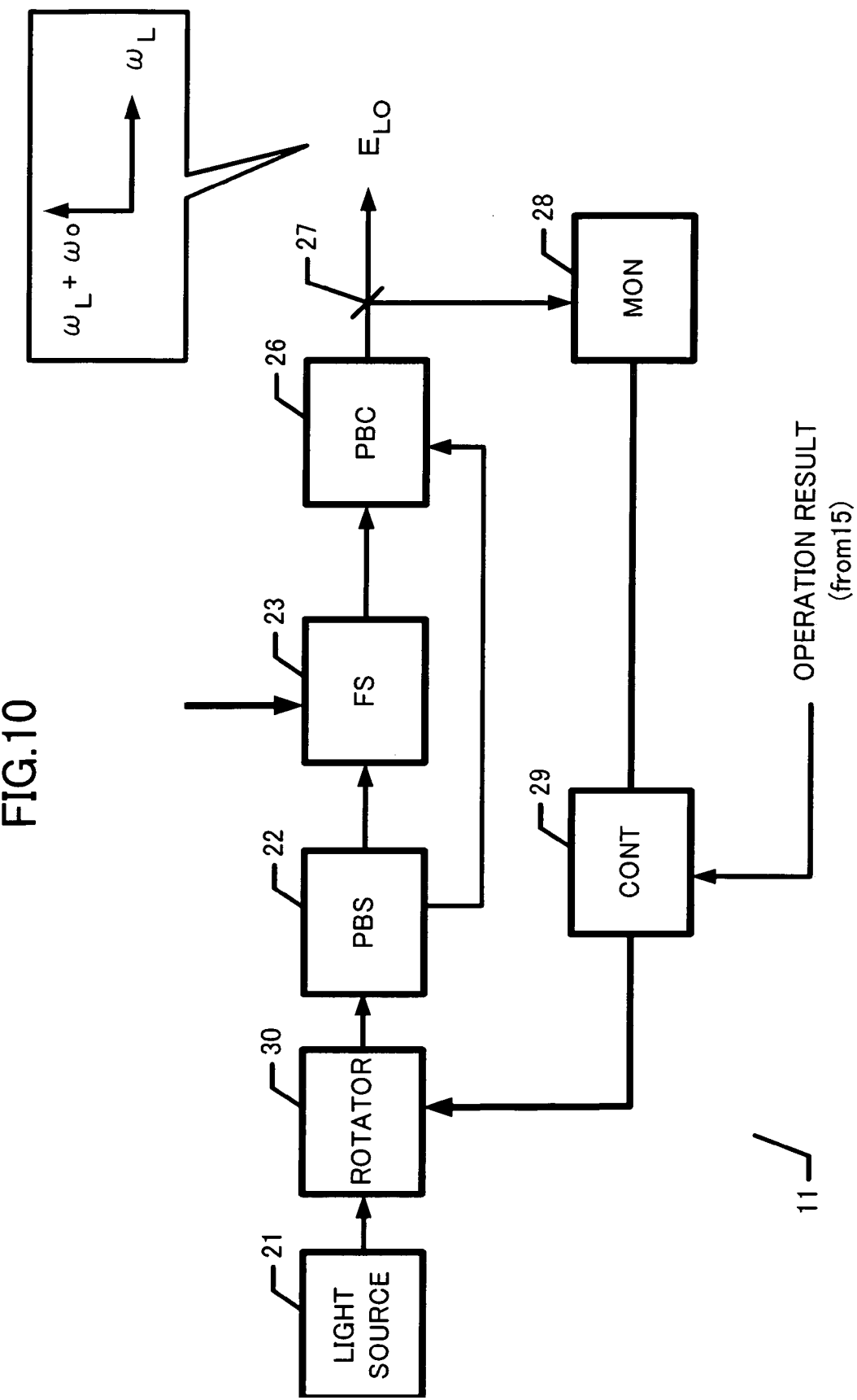
FIG. 10 is a diagram showing one modification of the second embodiment of the present invention.

Incidentally, as the specific structure of the modulated local light generator 11 according to the second embodiment, the frequency shifter 23 shifts the optical angular frequency of one of the polarization components by $\omega_0$ (third clock) and the VOA 25 controls the ratio of amplitudes between the orthogonal polarization components in the example (FIG. 7). However, the structure of the local oscillator according to the present invention is not limited to this. As shown in FIG. 10, in place of the VOA 25, a polarization rotator 30 can be arranged between the light source 21 and the PBS 22, and the polarization rotator 30 can be controlled in accordance with an output signal from the intensity ratio controller 29, thereby changing the ratio of intensity (amplitude) between the orthogonal polarization components split by the PBS 22. Further, in place of the PBS 22 and the VOA 25, a 1×2 splitter with variable splitting ratio can be applied. A splitter with variable splitting ratio applying a Mach-Zehnder interferometer is well-known.

Figure 11:
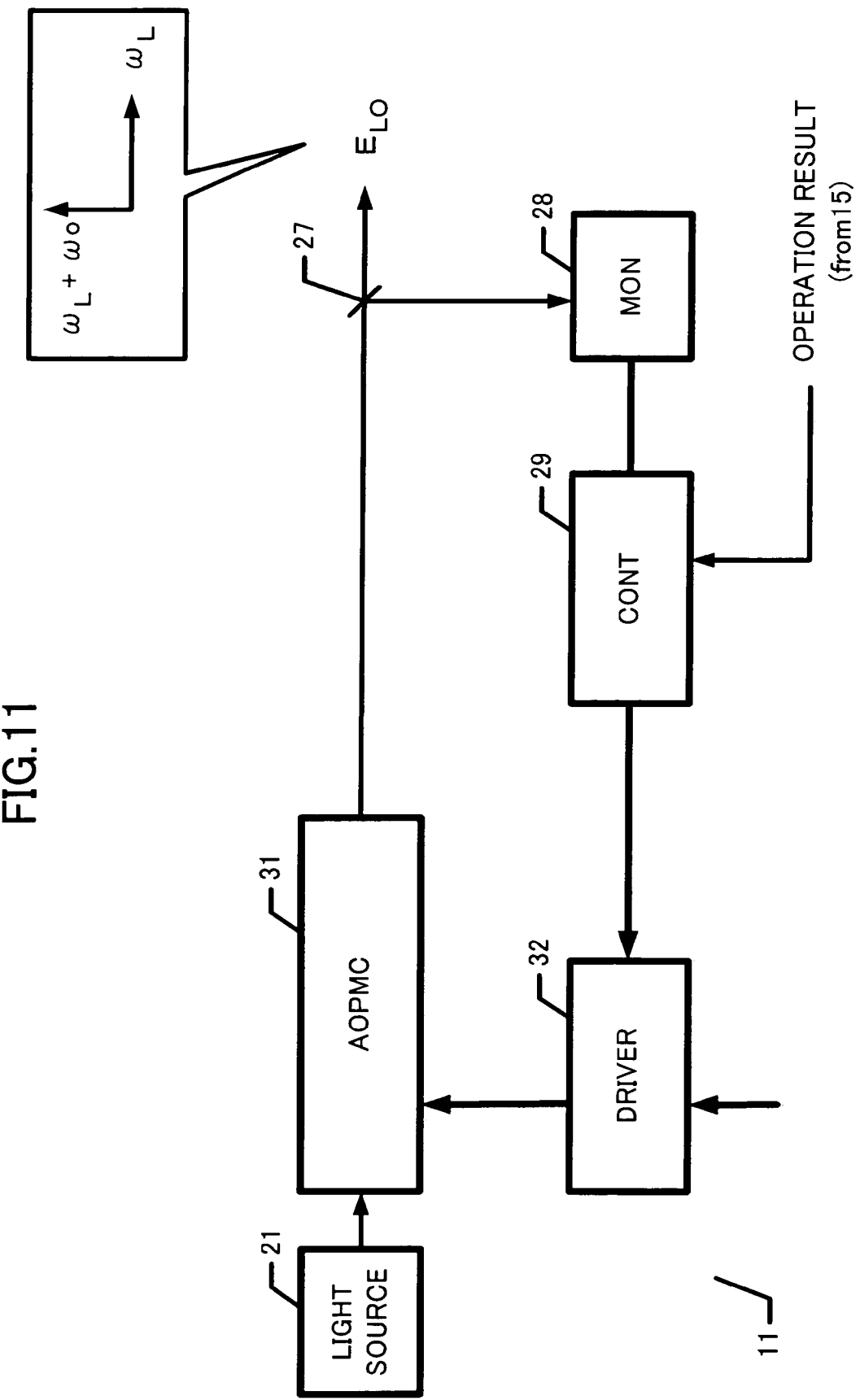
FIG. 11 is a diagram showing another modification of the second embodiment.

Further, as shown in FIG. 11, the output light from the light source 21 can be sent to an acousto-optic polarization mode converter 31, and the frequency signal $\omega_0$ (=2π$\Delta$f, third clock) from the repetitive pattern generator 8e can be sent, thereby generating the local oscillator light $E_{LO}$ having the orthogonal polarization components with the optical angular frequencies $\omega_L$ and $\omega_L + \omega_0$, where the ratio of intensity between the orthogonal polarization components is controlled. In this case, the frequency signal from the repetitive pattern generator 8e is sent to a driver circuit 32 for driving the acousto-optic polarization mode converter 31, and power of a drive signal outputted from the driver circuit 32 is controlled in accordance with a control signal from the intensity ratio controller 29, thereby outputting the local oscillator light $E_{LO}$ similar to that in an example of the structure shown in FIG. 7 or 11 from the acousto-optic polarization mode converter 31. Incidentally, it is possible to use the acousto-optic polarization mode converter 31 disclosed in, e.g., a document: David A. Smith et al., "Integrated-optic acoustically-tunable filters for WDM networks", IEEE Journal on Selected Areas in Communications, Vol. 8, No. 6, on August, 1990. The modulated local light generator 11 using the acousto-optic polarization mode converter 31 is applied, thereby further simplifying the structure. Accordingly, an optical receiver with a smaller scale can be provided.

[C] Third Embodiment

Figure 12:
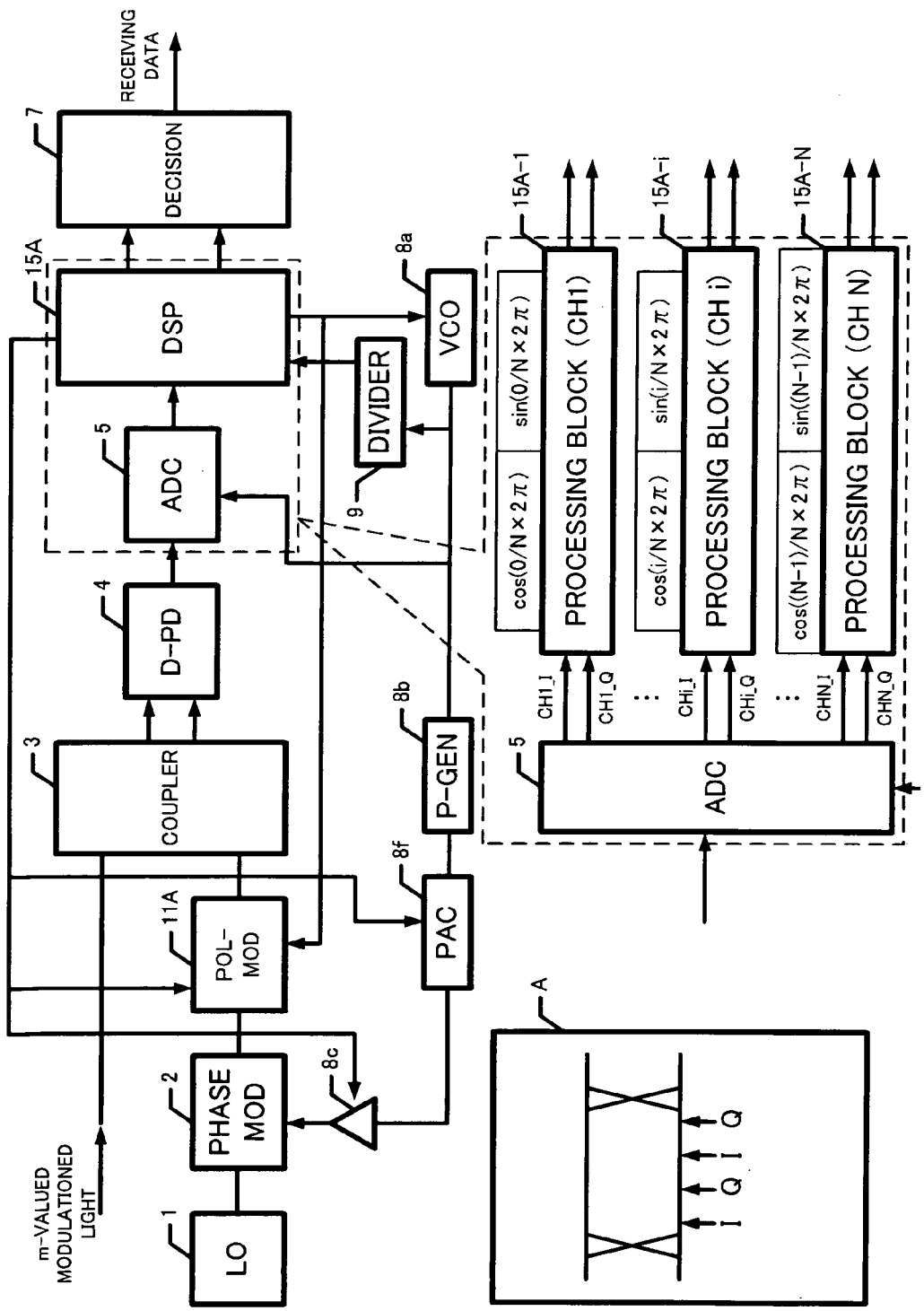
FIG. 12 is a diagram showing a coherent light receiver according to the third embodiment of the present invention.

FIG. 12 is a block diagram showing a coherent light receiver 10B according to the third embodiment of the present invention. The coherent light receiver 10B shown in FIG. 12 can be applied as the optical receiver 306 in FIG. 3. Herein, the coherent light receiver 10B according to the third embodiment comprises a polarization modulator (POL-MOD) 11A for polarization modulation (refer to reference numeral 11 in FIG. 7, 10, or 11 according to the second embodiment), in place of the polarization controller 20 in the structure of the coherent light receiver 10 according to the first embodiment.

Herein, the coherent light receiver 10B shown in FIG. 12, the LO 1 and the phase modulator 2 form a first modulation-light output unit for outputting light (local-oscillator modulation light) modulated with an optical frequency on the basis of the second clock phase-synchronized with the first clock. By setting the reception signal light as m-valued modulation light (mPSK, mQAM, etc.) (symbol rate is X/log$_2$ m) at a transfer bit rate X [Gb/s], the VCO 8a generates the clock signal at a symbol rate of 2 kX/log$_2$m [GHz] as the first clock. The frequency of the second clock supplied from the phase shift adjustor 8c is kX/log$_2$m.

Incidentally, parameter k denotes the number (k≧1) of times for obtaining sample data by the ADC 5 for the systems I and Q every symbol. That is, as shown by parameter A in FIG. 12, if k=2, the sample data is obtained twice for the individual systems I and Q every symbol. As a consequence, without the phase diversity structure shown in FIG. 15, signal processing substantially corresponding to the phase diversity is executed, thereby reproducing the data.

Further, the polarization modulator 11A has the similar structure excluding the light source 21 in the modulated local light generator 11 shown in FIG. 7, 10, or 11. Further, the polarization modulator 11A has a second modulation-light output unit that generates light two orthogonal polarization components with optical frequencies different by a frequency $\omega_0$ based on the third clock having a frequency of one integral-th of the first clock from the VCO 8a, phase-synchronized with the first clock, from the light from the phase modulator 2 and further outputs the local oscillator light to the optical coupler 3.

Incidentally, if the polarization modulator 11A has the structure (reference numerals 22, 23, or 25 to 29) shown in FIG. 7, the light output from the phase modulator 2 is inputted to the PBS 22. Further, if the polarization modulator 11A has the structure (reference numeral 22, 23, or 26 to 30) shown in FIG. 10, the light outputted from the phase modulator 2 is inputted to the polarization rotator 30. Furthermore, if the polarization modulator 11A has the structure (reference numeral 27 to 29, 31, or 32) shown in FIG. 11, the light outputted from the phase modulator 2 is inputted to the acousto-optic polarization mode converter 31.

Therefore, the LO 1, the phase modulator 2 and the polarization modulator 11A form a modulator (modulated local light generator) sets, as local-oscillator modulation light, light modulated with the optical frequency based on the second clock having a frequency of one integral-th of the first clock, phase-synchronized with the first clock, corresponding to light having the orthogonal polarization components with optical frequencies different by a frequency based on a third clock having a frequency of one integral-th of the first clock, phase-synchronized with the first clock.

Incidentally, the order of the phase modulator 2 and the polarization modulator 11A may be inverted.

Herein, in digital signal processing 15A, upon setting one set of an operation of the digital signal having the first system (I) and an operation of the digital signal having the second system (Q), the number of frequency division of the divider 9 is 2N, thereby performing parallel operation of parallel-developed N channels. That is, processing blocks 15A-1 to 15A-N for channels ch.1 to ch.N forming the digital signal processing 15A capture the clock signals divided by the divider 9 as operation clocks, and performs operation processing for obtaining the signal vector s(t).

In the ADC 5, the digital signals having the first system and the second system sampled at continuous sampling timings as one set are sequentially outputted, as N-parallel signals, to the processing blocks 15A-1 to 15A-N for the channels ch.1 to ch.N forming the digital signal processing 15A. Incidentally, the ADC 5 samples data synchronously with a first clock signal from the VCO 8a, thereby sampling data at a rate of 2 $kX/\log_2 m$ [Gsample/s].

At this time, similarly to the case according to the second embodiment, the polarization modulator 11A can use the clock signal outputted from the divider 9 as a frequency signal for prescribing the frequency difference $\Delta f$ ($=\Delta\omega/2\pi$) between the orthogonal polarization components. As a consequence, the circuits are shared and the term of cos $\Delta\omega t$ (if adding $\Delta\phi_0$, $\cos(\Delta\omega t - \Delta\phi_0)$) in the denominator and the term of $e^{j\Delta\omega t}$ (if adding $\Delta\phi_0$, $e^{j(\Delta\omega t - \Delta\phi_0)}$) in the numerator are set as constants for every channel in the expression (9) for calculating the signal vector s(t) with the processing blocks 15A-1 to 15A-N.

Further, in order to generate the frequency signal for prescribing the frequency difference $\Delta f$, a divider for dividing the output from the divider 9 by a (where a is an integer) is provided, thereby setting $\Delta f$ as $2 kX/aN\log_2 m$ [GHz].

Incidentally, upon using the structure shown in FIG. 11 having the acousto-optic polarization mode converter (AOPMC) 31 as the polarization modulator 11A, the divider 9 can be structured so that the frequency difference $\Delta f$ is 50 MHz to 500 MHz, and the ADC 5 and digital signal processing 15A can be further provided.

Further, reference numeral 8f denotes a phase adjusting circuit. The phase adjusting circuit 8f adjusts the phases under the control of the digital signal processing 15A so as to match the phases of the first and second clocks supplied from the VCO 8a to the ADC 5 and the phase modulator 2 to each other. As a consequence, the sampling timing of the ADC 5 matches the phase modulation timing of the phase modulator 2. Further, in the drawing, the phase adjusting circuit (PAC) 8f mediates on a clock signal line of the phase modulator 2 and however may mediate on a clock signal line to the ADC 5.

As mentioned above, the coherent light receiver 10B according to the third embodiment has the advantages obtained according to the first and second embodiments.

[D] Fourth Embodiment

Figure 19:
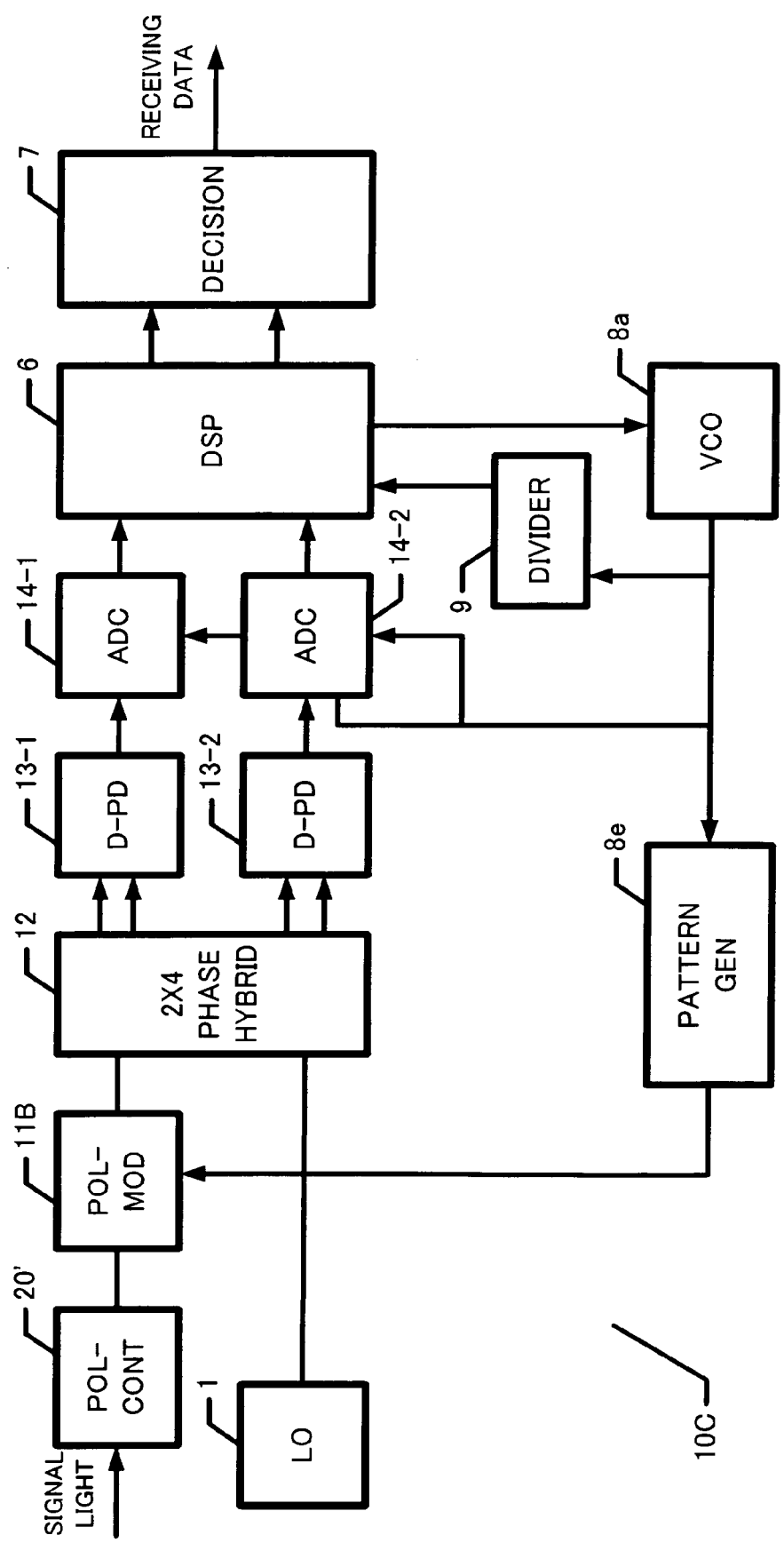
FIG. 19 is a block diagram showing a coherent light receiver according to the fourth embodiment of the present invention.

FIG. 19 is a block diagram showing a coherent light receiver 100 according to the fourth embodiment of the present invention. The coherent light receiver 100 shown in FIG. 19 performs the modulation of the reception signal light corresponding to polarization modulation according to the second embodiment. Herein, in FIG. 19, the same reference numerals as those in FIG. 6 denote the same components. A polarization controller 20' controls and outputs reception signal light to be inputted to set a state of polarization (SOP) to a specific SOP X, and comprises, e.g., the above-mentioned infinite following auto-polarization controller.

A polarization modulator 11B forming a modulator comprises LN (LiNbO$_3$), as disclosed as a polarization scrambler in, e.g., Patent Document (Japanese Patent No. 3777045). Further, a driver circuit (refer to reference numeral 32 in FIG. 11) receives a third clock (having a frequency of one integral-th of the first clock generated by the VCO 8a, phase-synchronized with the first clock) from the repetitive pattern generator 8e, and polarization-modulates the reception signal light on the basis of the third clock.

At this time, the LN polarization modulator rotates a polarization surface by assuming the SOP is the specific SOP X (e.g., linear polarization inclined with 45 degrees from the TE mode). Simultaneously, the LN polarization modulator generates a polarization-surface rotation of the polarization component vertical to the polarization surface.

Further, the polarization modulator 11B can be formed as a similar structure as the light source 21 in the modulated local light generator 11 shown in FIG. 11, except that the light source 21 is not necessary. Furthermore, a driver circuit (refer to reference numeral 32 in FIG. 11) receives the third clock (having a frequency of one integral-th of the first clock generated by the VCO 8a, phase-synchronized with the first clock) from the repetitive pattern generator 8e, and polarization-modulates the reception signal light on the basis of the third clock.

At this time, the acousto-optic polarization mode converter (refer to reference numeral 31 in FIG. 11) comprises, e.g., LN (LiNbO$_3$). The acousto-optic polarization mode converter structured as the LN modulator polarization-modulates both a specific polarization component (e.g., TE mode) of the reception signal light and a polarization component (e.g., TM mode) orthogonal to the specific polarization component into light having orthogonal polarization components with optical frequencies different by a frequency based on the third clock.

The coherent light receiver 100 with the above structure realizes coherent reception without depending on the polarization with a simple structure, similarly to the case according to the second embodiment. Therefore, a small-scaled optical receiver can be provided. Further, since the polarization modulation is performed with a clock deprived from the VCO 8a as the clock signal source common to that of the clock signal used for sampling the digital signals in the ADCs 14-1 and 14-2, the operation processing of the signal vector s(t) in the digital signal processing 15 can be greatly simplified.

Further, the inventor of the present invention finds that, when characteristics including polarization mode dispersion and non-linear effect of an optical line of the applied optical communication system (refer to FIG. 3) deteriorate the degree of polarization (DOP) of the reception signal light. Then, if providing the infinite following auto-polarization controller 20 shown in FIG. 1, the stability of characteristic of an error rate of the coherent optical reception can be an issue.

The coherent light receiver 10C according to the fourth embodiment can obtain the above advantages, and enables stable coherent optical reception, even if the characteristics including the polarization mode dispersion and non-linear effect of the optical line deteriorate the DOP of the reception signal light.

Incidentally, the structure as the phase modulator 2 according to the first embodiment may be added to a structure as the coherent light receiver 10C according to the fourth embodiment and, alternatively, the polarization controller 20', the polarization modulator 11B, and the structure corresponding to the phase modulator 2 may be added to an optical propagation line of the reception signal light to be inputted to the optical mixer.

[E] Fifth Embodiment

Figure 20:
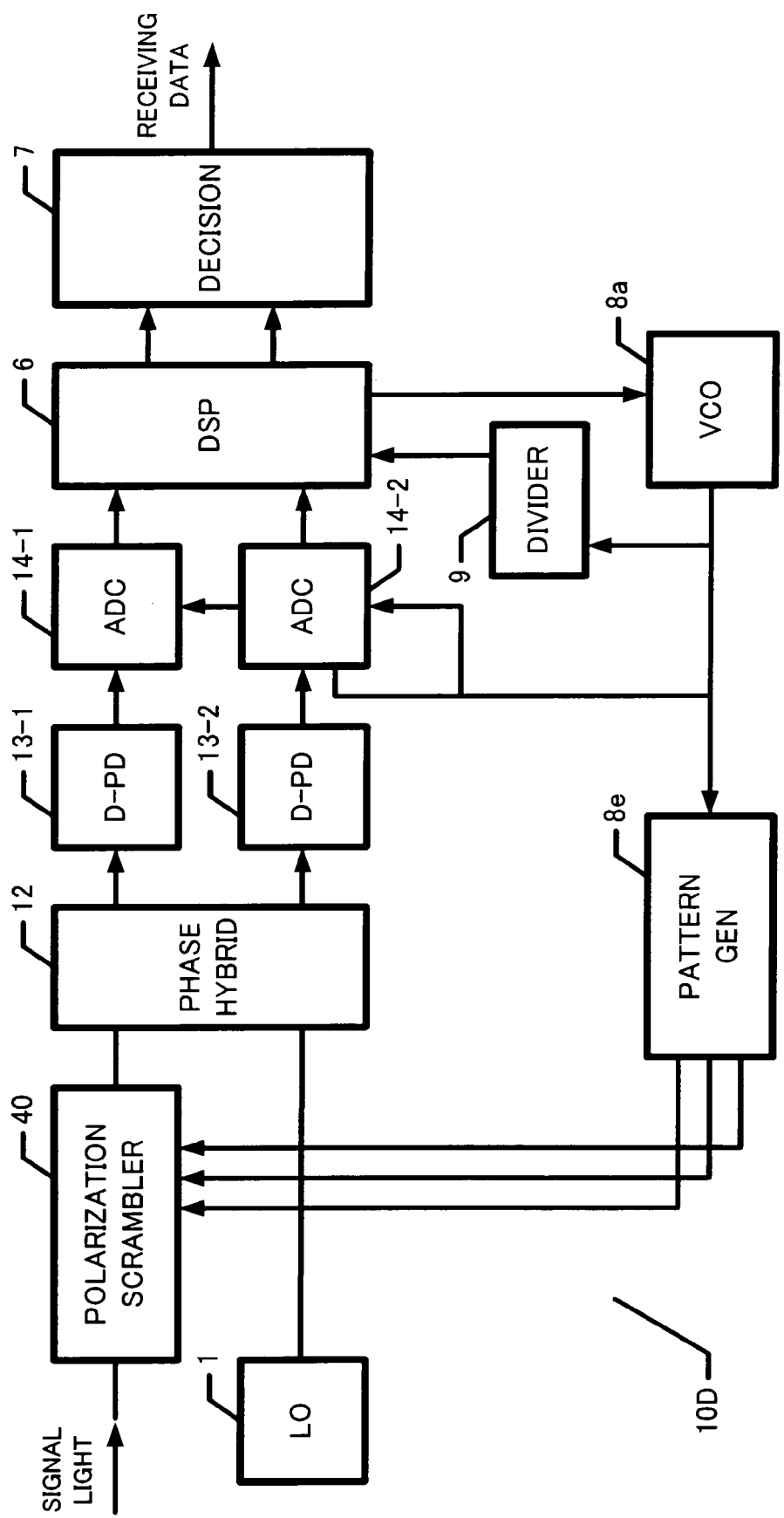
FIG. 20 is a block diagram showing a coherent light receiver according to the fifth embodiment of the present invention.

FIG. 20 is a block diagram showing a coherent light receiver 10D according to the fifth embodiment of the present invention. As compared with the coherent light receiver 10C according to the fourth embodiment, the coherent light receiver 10D shown in FIG. 20 comprises a polarization scrambler 40 as a modulator, in place of the polarization controller 20' and the polarization modulator 11B. Incidentally, in FIG. 20, the same reference numerals as those in FIG. 19 denote the same components.

The polarization scrambler 40 can comprise, for example, two ¼-wavelength plates after/before a ½-wavelength plate, and the wavelength plates can be rotated synchronously with a frequency from the repetitive pattern generator 8e, thereby rotating the SOP of the reception signal light. In other words, the polarization scrambler 40 is a reception signal light modulator that receives a fourth clock phase-synchronized with the first clock from the VCO 8a from the repetitive pattern generator 8e, and modulates the reception signal light to be inputted to the 2×4 phase hybrid circuit 12 on the basis of the third clock.

The digital signal processing 15 reproduces the signal vector on the basis of light obtained by coupling the reception signal light whose SOP is rotated as mentioned above and LO light through the digital operation processing. At this time, since a rotation period of the SOP is phase-synchronized with sampling frequencies of the ADCs 14-1 and 14-2, and the load of the operation processing can be greatly reduced.

Incidentally, the polarization scrambler 40 can use other well-known structures than rotatable wavelength plate, e.g., a structure using a plurality of fiber squeezers obtained by mutually tilted by 45 degrees, etc. Incidentally, the polarization scrambler is disclosed in a document ("tutorial", [online], Hakuto Co., Ltd., [searched on August 6 in 2007] on the Internet site <http://www-newport-japan, jp/pdf/phot_0044.pdf>).

Incidentally, the structure as the phase modulator 2 according to the first embodiment may be added to the structure as the coherent light receiver 10D according to the fifth embodiment and, alternatively, the polarization scrambler 40 and a structure corresponding to the phase modulator 2 may be added to an optical propagation line of the reception signal light to be inputted to the optical mixer.

[F] Others

The present invention is not limited to the embodiments and can be variously modified within a range of the essentials of the present invention.

According to the first and third embodiments, the optical coupler 3 outputs two differential output signals. However, the optical coupler 3 may output one differential output signal according to the present invention (i.e., the optical coupler 3 may be an optical coupler with two inputs and one output). In this case, the light receiver 4 may have one input, in place of the differential input.

Further, according to the second, fourth, and fifth embodiments, the 2×4 phase hybrid circuit 12 has the 2×4 configuration to provide differential outputs. However, the 2×2 phase hybrid circuit 12, having single-ended outputs, may be used instead.

Figure 13:
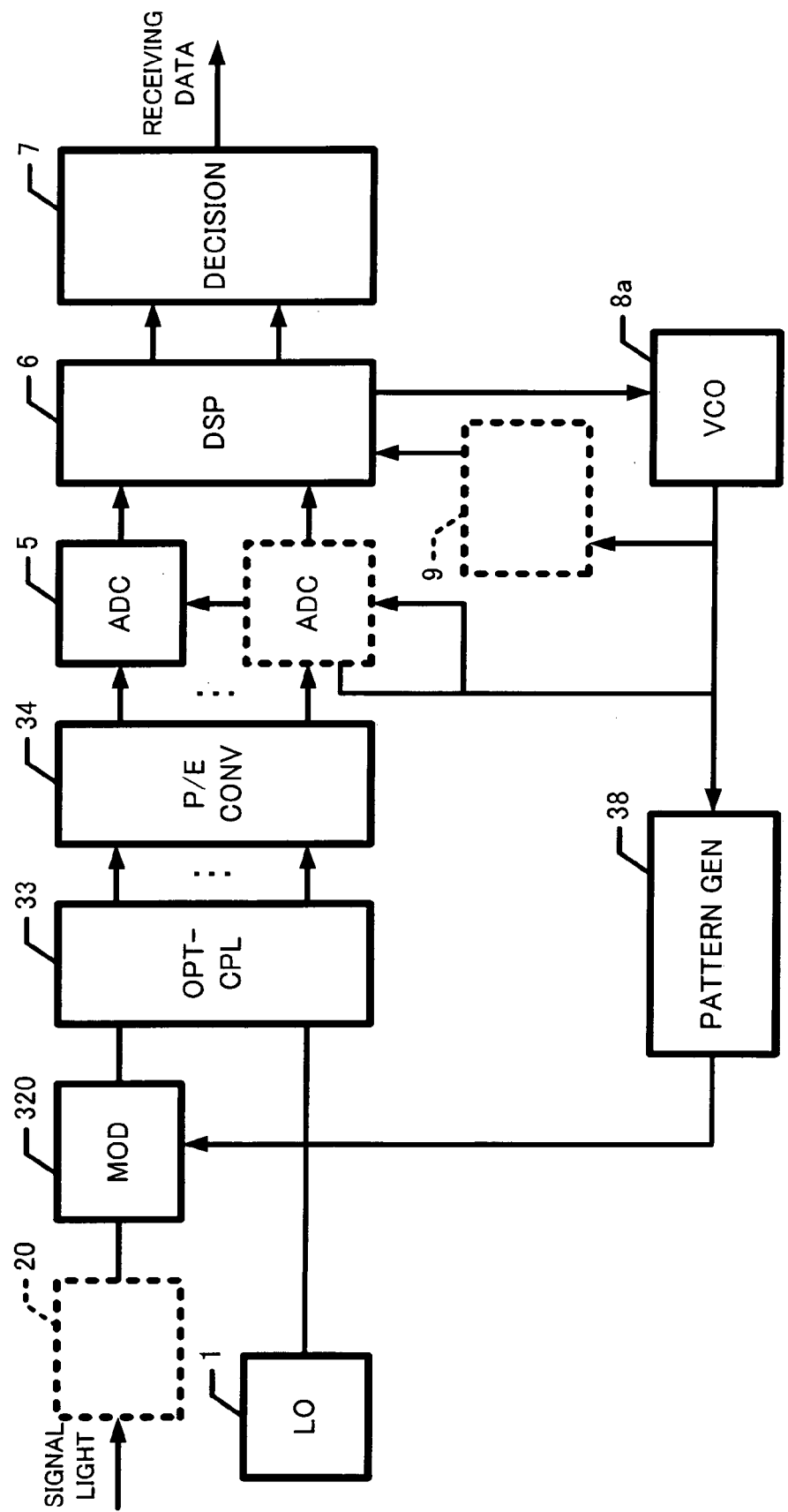
FIG. 13 is a diagram showing one modification according to the third embodiment.

Further, according to the first and third embodiments, the modulator modulates the local oscillator light (refer to reference numeral 2 in FIG. 1, reference numeral 1' in FIG. 4, reference numeral 11 in FIG. 6, and reference numerals 2 and 11A in FIG. 12). According to the present invention, the function of a modulator 320 shown in FIG. 13 may be provided on the optical propagation line of the reception signal light. In this case, the modulator (MOD) 320 is a reception signal light modulator that modulates the reception signal light to be inputted to the optical coupler 33 on the basis of a clock phase-synchronized with the first clock.

That is, by providing a modulator for phase-modulating the reception signal light identically to the phase modulator 2 according to the first embodiment as the modulator 320 of the reception signal light, digital signal processing 36 can perform processing for extracting the reception data similarly to the case according to the first embodiment. In this case, the LO 1, the optical coupler 33, a photoelectric converter (P/E CONV) 34, an analog to digital converter (ADC) 35, the digital signal processing 36, the decision 7, the VCO 8a, and a repetitive pattern generator 38 have substantially the same structure as that according to the first embodiment (refer to reference numeral 3 to 7 and 8a and 8b in FIG. 1).

Further, if the modulator 320 of the reception signal light modulates the reception signal light similarly to the phase modulator 2 and the polarization modulator 11A according to the third embodiment, the advantages according to the first and second embodiments are obtained. In this case, the optical coupler (OPT-CPL) 33, the photoelectric converter 34, and the ADC 35 can be structured similarly to third embodiment (reference numerals 3 to 5 in FIG. 12). At this time, the modulator 320 of the reception modulation light comprises, as the structure corresponding to the phase modulator 2, a third modulation-light output unit that modulates the optical frequency or the optical phase of the reception signal light and outputs the modulated light on the basis of the second clock having a frequency of one integral-th of the first clock, phase-synchronized with the first clock. Further, the modulator 320 of the reception modulation light comprises, as the structure corresponding to the polarization modulator 11A, a fourth modulation-light output unit that modulates light from the third modulation-light output unit to light having two orthogonal polarization components with optical frequencies different by a frequency based on the third clock having a frequency of one integral-th of the first clock, phase-synchronized with the first clock, and outputs the modulated light to the optical coupler 33.

Figure 14:
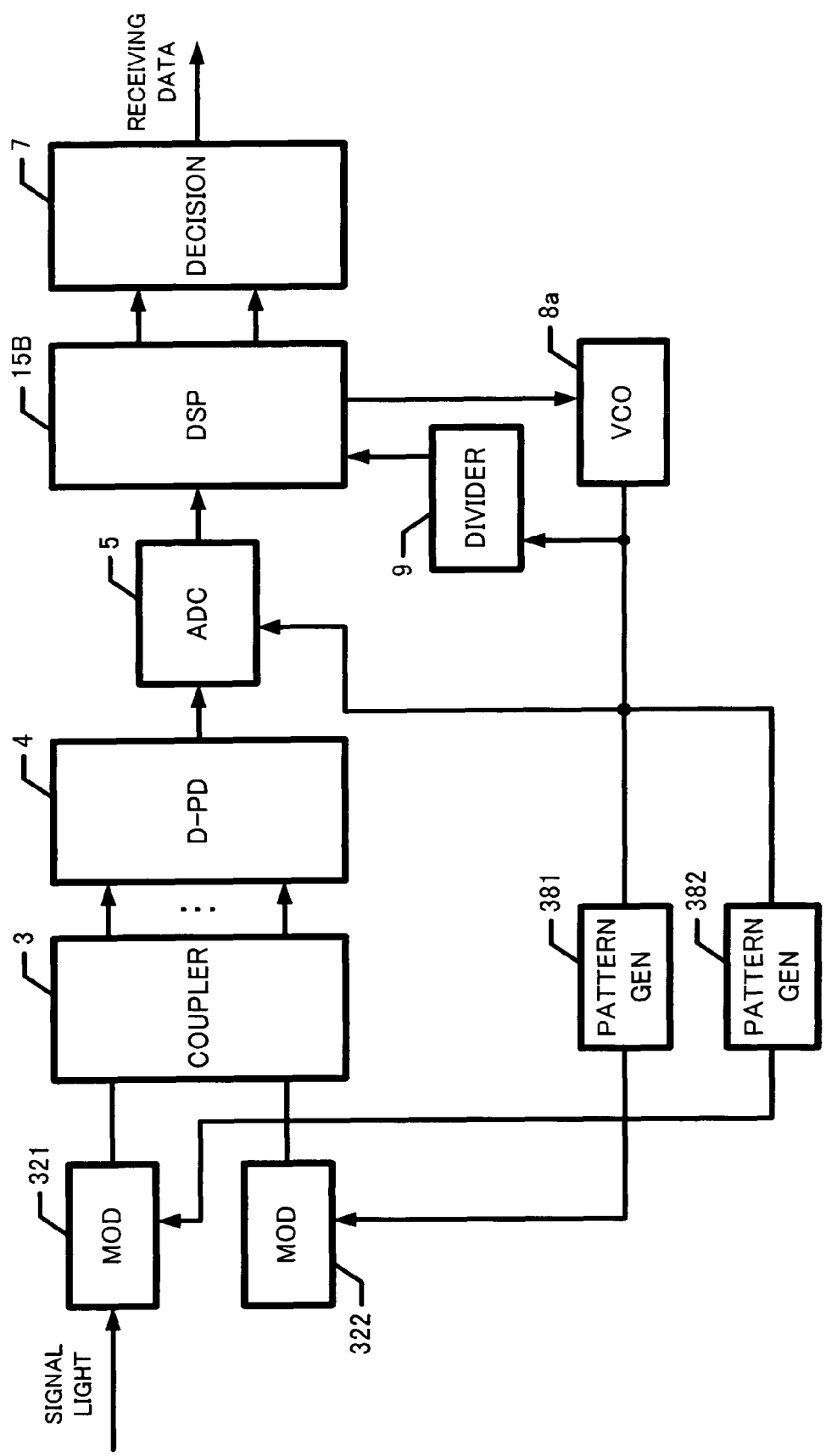
FIG. 14 is a diagram showing another modification of the third embodiment according to the present invention.

Further, modulators (MOD) 321 and 322 shown in FIG. 14 may modulate an optical frequency or optical phase of one of the local oscillator light and the reception signal light on the basis of the second clock having a frequency of one integral-numbers of the first clock, phase-synchronized with the first clock, and may modulate the other of the local oscillator light and the reception signal light to light having two orthogonal polarization components with optical frequencies different by a frequency based on the third clock having a frequency of one integral-th of the first clock, phase-synchronized with the first clock. Then, the same advantages as those according to the third embodiment can be also obtained.

As shown in FIG. 14, as the modulator 321, the structure corresponding to the polarization modulator 11A shown in FIG. 12 may be provided. Further, as the modulator 322, a structure having the LO 1 and the phase modulator 2 shown in FIG. 12 may be provided. Accordingly, the same advantages as those according to the third embodiment can be obtained. Alternatively, as the modulator 321, a structure corresponding to the phase modulator 2 shown in FIG. 1 can be provided and, as the modulator 322, a structure as the modulated local light generator 11 shown in FIG. 6 may be provided, thereby obtaining the same advantages as those according to the third embodiment.

Incidentally, in FIG. 14, reference numerals 381 and 382 denote repetitive pattern generators (modulated clock supply units) that supply clock signals having a repeating frequency of one integral-th of the first clock to the modulator 321 of the reception signal light and the output unit 322 of the local-oscillator modulation light.

Further, the ADCs 5, 14-1, and 14-2 may be interleaving-type converters, and the clock frequency to be supplied may be thus one integral-th of the sampling frequency. In this case, the structure obtained by omitting the repetitive pattern generator 8b, 8e, 38, 381, or 382 or by multiplying a first clock signal from the VCO 8a enables the clock signal to be generated and further enables a repeating pattern (second clock) for phase modulation to the phase modulator 2 to be generated. A rate of the frequency division of the divider 9 may be 1, i.e., the divider 9 may be omitted.

Further, the clocks generated by the repetitive pattern generator 8b, 8e, 38, 381, and 382 are not limited to a simple rectangular wave or sine wave but may be an arbitrary periodic waveform, e.g., an NRZ waveform corresponding to pseudo-random bit sequence. In this case, the digital signal processing 6, 15, 15A, 158, and 36 have a proper signal-processing circuit corresponding to the arbitrary waveform, thereby realizing the design for capturing a desired value.

In addition, a person skilled in the art can manufacture the apparatus according to the present invention by the disclosure of the embodiments of the present invention.

What is claimed is:

1. A coherent light receiver comprising:
   an optical mixer to couple local oscillator light and reception signal light;
   a photoelectric converter to photoelectrically convert coupled signal light obtained by a coupling operation of the optical mixer to an analogue electrical signal;
   an analogue-to-digital converter to convert, the analogue electrical signal to a sampled digital electrical signal;
   a reception data processing unit to extract reception data included in the reception signal light of the coupled signal light through a digital signal processing for processing, synchronously with a first clock, the coupled signal converted into the sampled digital electrical signal by the analogue-to-digital converter;
      an oscillation circuit to generate the first clock, and supply the first clock to the reception data processing unit;
      a modulation clock supply unit to generate a clock phase-synchronized with the first clock and supply the generated clock to the modulator, the generated clock having a repeating frequency of one integral-th or integral times of the frequency of the first clock; and
   a modulator to modulate the local oscillator light or the reception signal light to be inputted to the optical mixer respectively, by using the clock phase-synchronized with the first clock.

2. The coherent light receiver according to claim 1, further comprising:
   a frequency dividing circuit to divide a frequency of the first clock from the oscillation circuit and supply an operation clock with the divided frequencies to the reception data processing unit.

3. The coherent light receiver according to claim 2,
   wherein the modulator generates and outputs local-oscillator modulation light having two orthogonal polarization components with optical frequencies different by a frequency synchronizing with a third clock phase-synchronized with the first clock, the third clock having a repeating frequency of one integral-th or integral times of the frequency of the first clock,
   wherein the third clock to the modulator is substantially identical to the operation clock to the reception data processing unit.

4. The coherent light receiver according to claim 1,
   wherein the reception data processing unit controls the first clock generated by the oscillation circuit on the basis of an execution result of the digital signal processing.

5. The coherent light receiver according to claim 1, further comprising:
   a data decision unit to execute decision processing of the reception data on the basis of an operation result of the digital signal processing.

6. An optical communication system including the coherent light receiver according to claim 1.

7. The coherent light receiver according to claim 1, wherein the modulator generates local-oscillator modulation light modulated on a basis of synchronously with a clock phase-synchronized with the first clock and outputs the generated light to the optical mixer.

8. The coherent light receiver according to claim 1,
   wherein the clock phase-synchronized with the first clock has a frequency of two or more times as integral times of a symbol frequency of the reception signal light.

9. The coherent light receiver according to claim 7, further comprising:
   polarization control means for adjusting a polarization state of the reception signal light inputted to the optical mixer, with a polarization state of the local-oscillator modulation light.

* * * * *

UNITED STATES PATENT AND TRADEMARK OFFICE
CERTIFICATE OF CORRECTION

PATENT NO. : 8,406,638 B2
APPLICATION NO. : 12/219937
DATED : March 26, 2013
INVENTOR(S) : Takeshi Hoshida Page 1 of 1

It is certified that error appears in the above-identified patent and that said Letters Patent is hereby corrected as shown below:

In the Claims

Column 28, Line 35, In Claim 7, after "modulated" delete "on basis of".

Signed and Sealed this
Second Day of July, 2013

Teresa Stanek Rea
*Acting Director of the United States Patent and Trademark Office*